United States Patent
Zhang et al.

(10) Patent No.: US 12,304,471 B2
(45) Date of Patent: May 20, 2025

(54) METHOD FOR VISUALLY TRACKING GAZE POINT OF HUMAN EYE, VEHICLE EARLY WARNING METHOD AND DEVICE

(71) Applicant: GUANGZHOU AUTOMOBILE GROUP CO., LTD., Guangzhou (CN)

(72) Inventors: Jin Zhang, Guangzhou (CN); Zhijun Cai, Guangzhou (CN); Ying Zhang, Guangzhou (CN)

(73) Assignee: GUANGZHOU AUTOMOBILE GROUP CO., LTD., Guangzhou (CN)

( * ) Notice: Subject to any disclaimer, the term of this patent is extended or adjusted under 35 U.S.C. 154(b) by 364 days.

(21) Appl. No.: 17/908,128

(22) PCT Filed: Jun. 4, 2021

(86) PCT No.: PCT/CN2021/098341
§ 371 (c)(1),
(2) Date: Aug. 30, 2022

(87) PCT Pub. No.: WO2021/249300
PCT Pub. Date: Dec. 16, 2021

(65) Prior Publication Data
US 2023/0025540 A1     Jan. 26, 2023

(30) Foreign Application Priority Data

Jun. 11, 2020   (CN) .......................... 202010528103.0

(51) Int. Cl.
 *B60W 30/095*   (2012.01)
 *B60W 40/08*    (2012.01)
 *B60W 50/14*    (2020.01)

(52) U.S. Cl.
 CPC .......... *B60W 30/095* (2013.01); *B60W 40/08* (2013.01); *B60W 50/14* (2013.01);
(Continued)

(58) Field of Classification Search
 CPC .... B60W 30/095; B60W 40/08; B60W 50/14; B60W 2540/225; B60W 2040/0827; B60W 2050/143
(Continued)

(56) References Cited

U.S. PATENT DOCUMENTS 5,583,795 A * 12/1996 Smyth .................. A61B 3/0025
                                                    702/92
5,835,797 A * 11/1998 Odaka ................ G02B 27/0093
                                                    396/51
(Continued)

*Primary Examiner* — Luis A Martinez Borrero
(74) *Attorney, Agent, or Firm* — ScienBiziP, P.C.

(57) ABSTRACT

A method for visually tracking a gaze point of a human eye includes: periodically obtaining position coordinates of a human eye of a driver of a host vehicle and coordinates of a gaze point of a sightline of the human eye on an inner side of a current projection screen; in combination with a refractive index and a curvature of the current projection screen, coordinates of a gaze point of the sightline on an outer side of the current projection screen and a corresponding refracted light path formed by outward refraction of the sightline are obtained, and in combination with a preset normal viewing distance of the human eye, a final gaze point of the sightline on the refracted light path and coordinates of the final gaze point are obtained.

20 Claims, 11 Drawing Sheets

The host vehicle periodically receives position coordinates of a human eye of a driver of the host vehicle and coordinates of a gaze point of a sightline of the human eye on an inner side of a current projection screen, provided by a visual tracking device; wherein, the current projection screen is a windshield glass or a front window of the host vehicle — S1

The host vehicle screens out a refractive index and a curvature of the current projection screen, and combines with the position coordinates of the human eye and the coordinates of the gaze point of the sightline on the inner side of the current projection screen, obtains coordinates of a gaze point of the sightline on an outer side of the current projection screen and a corresponding refracted light path formed by outward refraction of the sightline, and further combines with a preset normal viewing distance of the human eye, obtains a final gaze point of the sightline on the corresponding refracted light path and coordinates of the final gaze point. — S2

(52) U.S. Cl.
CPC .............. *B60W 2040/0827* (2013.01); *B60W 2050/143* (2013.01); *B60W 2540/225* (2020.02)

(58) Field of Classification Search
USPC .......................................................... 701/10
See application file for complete search history.

(56) References Cited

U.S. PATENT DOCUMENTS

| | | | | |
|---|---|---|---|---|
| 8,077,914 B1* | 12/2011 | Kaplan | ................... | A61B 3/113 |
| | | | | 382/103 |
| 8,824,779 B1* | 9/2014 | Smyth | ..................... | G06T 7/73 |
| | | | | 382/117 |
| 9,589,187 B1* | 3/2017 | Chen | ..................... | G06V 40/193 |
| 9,619,722 B2* | 4/2017 | Takeda | ................. | G06V 40/193 |
| 9,811,729 B2* | 11/2017 | Santos-Villalobos | ....................... | |
| | | | | G06V 40/19 |
| 9,813,597 B2* | 11/2017 | Kim | ..................... | H04N 13/239 |
| 10,108,261 B1* | 10/2018 | Hall | ..................... | G06V 40/19 |
| 10,213,105 B2* | 2/2019 | Sarkar | ..................... | A61B 3/113 |
| 10,303,248 B2* | 5/2019 | Gibson | ..................... | G06F 3/013 |
| 10,317,672 B2* | 6/2019 | Sarkar | ................. | G02B 26/101 |
| 10,394,019 B2* | 8/2019 | Ryan | ..................... | G06F 3/013 |
| 10,564,718 B2* | 2/2020 | Na | ..................... | G06V 40/193 |
| 10,949,991 B2* | 3/2021 | Nie | ..................... | G06N 3/045 |
| 10,991,343 B2* | 4/2021 | Rong | ..................... | G06F 3/147 |
| 11,100,323 B2* | 8/2021 | Wilhelm | ............. | G06V 40/193 |
| 11,138,429 B2* | 10/2021 | Eskilsson | ........... | G02B 27/0093 |
| 11,262,839 B2* | 3/2022 | Young | ..................... | G06F 3/015 |
| 11,295,474 B2* | 4/2022 | Liu | ............................ | G06T 7/73 |
| 11,333,888 B2* | 5/2022 | Rong | ................. | G02B 27/0176 |
| 11,372,477 B2* | 6/2022 | Lin | ..................... | G06V 10/82 |
| 11,385,712 B2* | 7/2022 | Lussier | ................. | G06F 3/013 |
| 11,435,820 B1* | 9/2022 | Hirsh | ..................... | G06F 3/0346 |
| 11,442,541 B1* | 9/2022 | Dong | ..................... | G06F 3/013 |
| 11,474,600 B2* | 10/2022 | Ohkawa | ............. | G02B 27/0172 |
| 11,543,883 B2* | 1/2023 | Boyle | ..................... | H04N 23/74 |
| 11,624,907 B2* | 4/2023 | Kurz | ..................... | G06V 40/16 |
| | | | | 382/103 |
| 11,966,048 B1* | 4/2024 | Oudenhoven | ...... | G02B 27/0172 |
| 11,977,675 B2* | 5/2024 | Yu | ........................... | A61B 3/145 |
| 12,056,274 B2* | 8/2024 | Weinberg | ............... | G06N 20/00 |
| 12,124,624 B2* | 10/2024 | Boyle | ..................... | G06T 7/70 |
| 2003/0118217 A1* | 6/2003 | Kondo | ..................... | G06V 40/19 |
| | | | | 382/209 |
| 2013/0002846 A1* | 1/2013 | De Bruijn | ............ | G06V 40/193 |
| | | | | 348/78 |
| 2013/0050833 A1* | 2/2013 | Lewis | ..................... | G06T 7/73 |
| | | | | 359/630 |
| 2014/0139655 A1* | 5/2014 | Mimar | ................. | G08B 21/0476 |
| | | | | 340/575 |
| 2014/0240675 A1* | 8/2014 | Narasimha-Iyer | ..... | A61B 3/032 |
| | | | | 351/210 |
| 2015/0266486 A1* | 9/2015 | Silvlin | ................. | B60W 50/10 |
| | | | | 701/70 |
| 2015/0293381 A1* | 10/2015 | Mizuno | ............... | G02C 13/005 |
| | | | | 351/159.75 |
| 2016/0063304 A1* | 3/2016 | Yamashita | .......... | G06V 10/143 |
| | | | | 348/78 |
| 2016/0063326 A1* | 3/2016 | Yamashita | .......... | G02B 27/283 |
| | | | | 348/78 |
| 2016/0086338 A1* | 3/2016 | Nagamatsu | ............. | G06F 3/013 |
| | | | | 348/78 |
| 2016/0176339 A1* | 6/2016 | Aimura | ................. | B60K 37/20 |
| | | | | 701/301 |
| 2016/0267335 A1* | 9/2016 | Hampiholi | ............. | G08B 21/06 |
| 2017/0083746 A1* | 3/2017 | Kim | ..................... | H04N 23/56 |
| 2018/0129891 A1* | 5/2018 | Ryu | ..................... | G06V 20/59 |
| 2019/0236386 A1* | 8/2019 | Yu | ..................... | B60W 60/0015 |
| 2019/0246036 A1* | 8/2019 | Wu | ..................... | G06F 3/0484 |
| 2020/0039535 A1* | 2/2020 | Marberger | ........... | B60W 50/14 |
| 2021/0295073 A1* | 9/2021 | Yu | ........................ | B60W 50/16 |
| 2022/0281317 A1* | 9/2022 | Ahn | ......................... | G06T 3/18 |

* cited by examiner

METHOD FOR VISUALLY TRACKING GAZE POINT OF HUMAN EYE, VEHICLE EARLY WARNING METHOD AND DEVICE

CROSS-REFERENCE TO RELATED APPLICATIONS

This disclosure claims the priority of a Chinese patent application filed on Jun. 11, 2020, with the application number of 202010528103.0 and entitled "METHOD FOR VISUALLY TRACKING GAZE POINT OF HUMAN EYES, AND VEHICLE EARLY-WARNING METHOD AND APPARATUS". The contents of which are incorporated herein by reference.

TECHNICAL FIELD

This disclosure relates to automobile technical field, and in particular, to a method for visually tracking gaze point of human eye, a vehicle early warning method and a device.

BACKGROUND

With the development and popularization of vehicle intelligent driving technology, a demand for integrating various sensory data for early warning is increasing day by day.

Although a rapid development of cellular vehicle to everything (C-V2X) technology enables a vehicle to perceive an outside world, existing V2X applications do not involve line-of-sight information available in the visual tracking technology.

At present, although a traditional vehicle visual tracking technology involves the line-of-sight information, a gaze point identified in the line-of-sight information is limited to a point projected on a surface of a certain screen, resulting in limitations in recognitions. At the same time, because the traditional vehicle visual tracking technology cannot use information of a distant vehicle provided by the V2X technology, a reliable basis for vehicle collision warning cannot be provided.

Therefore, it is necessary to improve the traditional vehicle visual tracking technology to solve the limitations and deficiencies in the traditional vehicle visual tracking technology. At the same time, it is also necessary to combine the V2X technology with recognition of the gaze point of the visual tracking technology to enhance an accuracy and a scalability of the vehicle's collision warning, thereby improving a safety and a practicability of the vehicle.

SUMMARY

The technical problem to be solved by the embodiments of the present disclosure is to provide a method for visually tracking a gaze point of a human eye, a vehicle early warning method and a device, which not only can solve the limitations and deficiencies of the traditional vehicle visual tracking technology, but also combine the signal advantages of the V2X technology to enhance the accuracy and scalability of the vehicle's collision warning, and improve the safety and practicability of the vehicle.

In order to solve the above technical problems, the embodiments of the present disclosure provide a method for visually tracking a gaze point of a human eye, which is applied in a host vehicle, comprising:

The host vehicle periodically receiving position coordinates of a human eye of a driver of the host vehicle and coordinates of a gaze point of a sightline of the human eye on an inner side of a current projection screen, provided by a visual tracking device; wherein, the current projection screen is a windshield or a front window of the host vehicle;

The host vehicle screening out a refractive index and a curvature of the current projection screen, and combining with the position coordinates of the human eye and the coordinates of the gaze point of the sightline on the inner side of the current projection screen, obtaining coordinates of a gaze point of the sightline on an outer side of the current projection screen and a corresponding refracted light path formed by outward refraction of the sightline, and further combining with a preset normal viewing distance of the human eye, obtaining a final gaze point of the sightline on the corresponding refracted light path and coordinates of the final gaze point.

Wherein, the method further comprises:

If the host vehicle determines that the sightline is first refracted by the front window and then reflected by a rearview mirror, screening out a reflectivity and a curvature of the rearview mirror, and combining with a refracted light path formed by the outward refraction of the sightline through the front window, obtaining the coordinates of the gaze point on the rearview mirror after the sightline is refracted and a first reflected light path formed by the sightline after refraction, and further combining with the normal viewing distance of the human eye, and obtaining the final gaze point of the sightline on the first reflected light path and the coordinates of the final gaze point.

Wherein, the method further comprises:

If the host vehicle determines that the sightline is directly reflected by the rearview mirror without being refracted by the front window of the vehicle, receiving the coordinates of the gaze point of the sightline on the rearview mirror provided by the visual tracking device, obtaining a second reflected optical path directly formed by the sightline on the rearview mirror according to the position coordinates of the human eye and the reflectivity and curvature of the rearview mirror, and the coordinates of the gaze point of the sightline on the rearview mirror, and further combining with the preset normal viewing distance of the human eye, obtaining the final gaze point of the sightline on the second reflected light path and the coordinates of the final gaze point.

Wherein, the method further comprises:

The host vehicle periodically receiving the fatigue state of the driver of the host vehicle provided by the visual tracking device, and obtaining a fatigue degree of the driver according to the fatigue state of the driver, and further, when the fatigue degree of the driver reaches a preset alarm threshold, generating an alarm signal and sent the alarm signal to the driver of the host vehicle.

Wherein, the method further comprises:

If the host vehicle receives vehicle information sent by a distant vehicle within a certain period, the host vehicle broadcasting a signal carrying a sign of a vehicle being out-of-control to the distant vehicle.

Wherein, the host vehicle communicating with the visual tracking device based on a V2X broadcast signal or a CAN bus signal.

Wherein, the method further comprises:

The host vehicle communicating with the visual tracking device based on C-V2X technology, and sending its own ID to a portable device of the driver of the host vehicle through a TBOX, and the driver of the host vehicle forwards the ID to the visual tracking device for binding through the portable device, so as to realize a matching between the host vehicle and the visual tracking device.

Wherein, the method further comprises:

When the host vehicle detects a match between the host vehicle and the visual tracking device, the host vehicle calculating a distance between a centroid of the host vehicle and the visual tracking device, and when the calculated distance is determined to be less than or equal to a preset distance, receiving the position coordinates of the human eye and the coordinates of the gaze point of the sightline on the inner side of the windshield or the front window or/and the coordinates of the gaze point of the sightline on the rearview mirror, provided by the visual tracking device.

The present disclosure further provides a vehicle early warning method, wherein the method is used for the host vehicle to perform collision early warning based on the final gaze point or/and the fatigue state of the driver of the host vehicle obtained through the above method, and the method comprises:

The host vehicle acquiring vehicle information of the distant vehicle within a predetermined period, and acquiring the vehicle information of the host vehicle, the coordinates of the final gaze point of the sightline or/and the fatigue state of the driver of the host vehicle;

According to the vehicle information of the distant vehicle and the vehicle information of the host vehicle, the coordinates of the final gaze point of the sightline, or/and the fatigue state of the driver of the host vehicle, the host vehicle detecting whether a motion trajectory of the distant vehicle and the sightline intersect, and detecting whether the distant vehicle and the final gaze point of the sightline are located in a same relative azimuth area of the host vehicle and/or detecting the fatigue degree of the driver of the host vehicle, and according to detection results, the host vehicle determining a warning level of a collision between the host vehicle and the distant vehicle;

The host vehicle generating early warning information according to the warning level and sending the warning information to the driver of the host vehicle.

Wherein, the determining of the warning level of the collision between the host vehicle and the distant vehicle comprises:

The host vehicle substituting the vehicle information of the host vehicle and the vehicle information of the distant vehicle into a discretized kinematic bicycle model separately, and obtaining a motion equation of the host vehicle and a motion equation of the distant vehicle;

According to the vehicle information of the host vehicle and the vehicle information of the distant vehicle, constructing a rectangle model of the host vehicle and a rectangle model of the distant vehicle;

In the motion equation of the host vehicle and the motion equation of the distant vehicle, determining operating parameters corresponding to each moment;

According to the operating parameters and the coordinates of the final gaze point of the sightline, detecting whether the distant vehicle and the final gaze point of the sightline are located in the same relative azimuth area of the host vehicle, and detecting whether the motion trajectory of the rectangle model of the distant vehicle intersects with the sightline; and/or detecting the fatigue degree of the driver of the host vehicle according to the fatigue state of the driver of the host vehicle;

If the motion trajectory of the rectangle model of the distant vehicle does not intersect with the sightline, and the final gaze point of the sightline and the distant vehicle are not located in the same relative azimuth area of the host vehicle, and/or the fatigue degree of the driver of the host vehicle is greater than a first threshold, adjusting a warning time; otherwise, maintaining the warning time;

Iteratively calculating whether the rectangle model of the host vehicle and the rectangle model of the distant vehicle intersect, and when the rectangle model of the host vehicle intersects with the rectangle model of the distant vehicle, obtaining a collision time when the rectangle model of the host vehicle collides with the rectangle model of the distant vehicle;

Comparing the obtained collision time with the adjusted warning time or an original warning time, and calculating the warning level of the collision between the host vehicle and the distant vehicle according to a comparison result.

Wherein the method further comprises:

If the detecting of whether the motion trajectory of the distant vehicle and the sightline intersect, and the detecting of whether the final gaze point of the distant vehicle and the sightline is located in the same relative azimuth area of the host vehicle are need to be performed, the warning time is adjusted according to a formula $$t_w = \frac{t_{w0}}{1 + \frac{|B_n J|}{R_w} K};$$

Wherein, $t_w$ represents the adjusted warning time; $t_{w0}$ represents an initial warning time; $R_w$ represents a warning distance; $|B_n J|$ represents a distance of a line vector between position coordinates $B_n$ of the distant vehicle relative to the host vehicle and the coordinates J of the final gaze point of the sightline at time $t_n$, where, if the motion trajectory of the rectangular model of the distant vehicle and the sightline intersect, then $|B_n J|=0$; K equals 1 or 2, where if the final gaze point of the sightline and the distant vehicle are located in the same relative azimuth area of the host vehicle, then, K=1, otherwise K=2.

Wherein the method further comprises:

If only the fatigue degree of the driver of the host vehicle is need to be detected, the warning time is adjusted according to a formula $$t_w = \frac{t_{w0}}{M};$$

Wherein, $t_w$ represents the adjusted warning time; $t_{w0}$ represents the initial warning time; M represents the fatigue degree, and M is a positive integer, a value range of M is [1, 5]; a first threshold equals 1.

Wherein when the host vehicle determines that the fatigue degree M of the driver of the host vehicle reaches a second threshold, the host vehicle generates an alarm signal and sends the alarm signal to the drive of the host vehicle, and further broadcasts a signal carrying a vehicle being out of control to the distant vehicle.

Wherein if the detecting of whether the motion trajectory of the distant vehicle and the sightline intersect, the detecting of whether the distant vehicle and the final gaze point of the sightline are located in the same relative azimuth area of the host vehicle, and the detecting of the fatigue degree of the driver of the host vehicle are all need to be performed, the warning time is adjusted according to a formula $$t_w = \frac{t_{w0}}{M + \frac{|B_n J|}{R_w} K};$$

Wherein $t_w$ represents an adjusted warning time; $t_{w0}$ represents an initial warning time; M represents the fatigue degree of the driver of the host vehicle, which is a positive integer, a value range of M is [1, 5]; the first threshold equals 1; $R_w$ represents the warning distance; $|B_n J|$ represents a distance of a line vector between position coordinates $B_n$ of the distant vehicle relative to the host vehicle and the coordinates J of the final gaze point of the sightline at time $t_n$, where, if the motion trajectory of the rectangular model of the distant vehicle and the sightline intersect, then $|B_n J|=0$; K equals 1 or 2, where if the final gaze point of the sightline and the distant vehicle are located in the same relative azimuth area of the host car, then, K=1, otherwise K=2.

Wherein the method further comprises:

When the host vehicle determines that the fatigue degree M of the driver of the host vehicle reaches a second threshold, the host vehicle generates an alarm signal and sends the alarm signal to the drive of the host vehicle, and further broadcasts a signal carrying a vehicle being out of control to the distant vehicle.

The present disclosure further provides a vehicle early warning device, applied on a host vehicle, comprising a storage device and a processor, wherein the storage device stores a computer program, wherein, when the processor executes the computer program, the blocks of the aforementioned vehicle warning method are implemented.

The embodiment of the present disclosure has the following beneficial effects:

First, the present disclosure is based on the position coordinates of the human eye provided by the visual tracking device and the coordinates of the gazing point of the sightline on the inner side of the current projection screen provided by the visual tracking device, and is based on the final gaze point of the sightline and its coordinates being obtained according to the refraction light path of the sightline formed according to the refractive index and curvature of the current projection screen, thereby overcoming the fact that the gaze point identified in the sightline of the traditional vehicle visual tracking technology being a point projected on a surface of a certain screen, which resulting in great limitations and deficiencies in the recognition result.

Second, the present disclosure adjusts the warning level of a collision between the host vehicle and a distant vehicle based on the final gaze point of the sightline or/and the state of the driver of the host vehicle, so that the vehicle can automatically adjusts its own collision warning according to the final gaze point of the sightline and/or the driver's fatigue state, so as to combine the signal advantages of V2X technology with the gaze point recognition advantages of visual tracking technology, and enhance the accuracy and scalability of the vehicle's own collision warning, and improve the vehicle's safety and usability;

Third, the identification of vehicles based on the C-V2X technology of the present disclosure is less affected by factors such as weather, and only relies on state data of the vehicle rather than curvature information of road, thereby further improving driving safety and comfort.

DESCRIPTION OF THE DRAWINGS

In order to more clearly illustrate the embodiments of the present disclosure or the technical solutions in the prior art, the following briefly introduces the accompanying drawings required for the description of the embodiments or the prior art. Obviously, the drawings in the following description are only embodiments of the present disclosure. For those of ordinary skill in the art, other drawings can also be obtained according to the provided drawings without any creative effort.

DETAILED DESCRIPTION

In order to make the objectives, technical solutions and advantages of the present disclosure clearer, the present disclosure will be further described in detail below with reference to the accompanying drawings.

Figure 1:
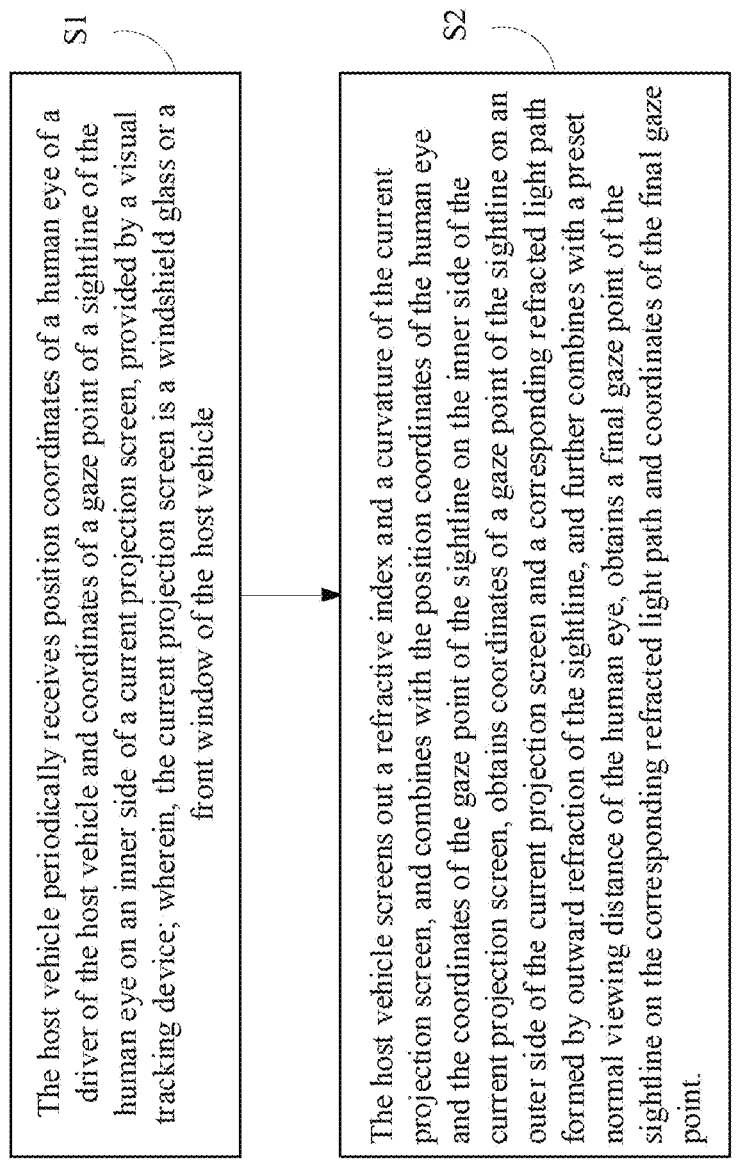
FIG. 1 is a flowchart of a method for visually tracking a gaze point of a human eye provided by a first embodiment of the present disclosure.

As shown in FIG. 1, a first embodiment of the present disclosure provides a method for visually tracking a gaze point of a human eye, which is applied in a host vehicle, and the method includes the following blocks:

Block S1, the host vehicle periodically receives position coordinates of a human eye of a driver of the host vehicle and coordinates of a gaze point of a sightline of the human eye on an inner side of a current projection screen, provided by a visual tracking device; wherein, the current projection screen is a windshield or a front window of the host vehicle;

A specific process includes, first, the host vehicle periodically (such as 120 S) communicates with the visual tracking device (such as a visual tracking helmets, a pair of glasses, or a vehicle-mounted camera each of which is integrated with a visual tracking function etc.) based on C-V2X technology (such as based on V2X broadcast signals) or other communication technology (such as based on CAN bus signals, etc.), and sends its own ID to a portable device (such as a mobile phone, a smart bracelet, etc.) of the driver of the host vehicle through a TBOX, and the driver of the host vehicle forwards the ID to the visual tracking device for binding through the portable device, so as to realize a matching between the host vehicle and the visual tracking device. For example, the mobile phone of the driver of the host vehicle is bound to the host vehicle through the TBOX of the host vehicle. The host vehicle generates a key related to the host vehicle's own ID according to needs of the driver of the host vehicle, and sends the key to the mobile phone of the driver of the host vehicle through the TBOX. The driver sends the key to the V2X visual tracking portable device through the mobile phone to complete an authorization. A V2X message sent by the authorized V2X visual tracking portable device is encrypted by the previously received key, and the message can only be parsed by the corresponding vehicle.

Secondly, when the host vehicle detects a match between the host vehicle and the visual tracking device, the host vehicle calculates a distance between a centroid of the host vehicle and the visual tracking device, and periodically (for example, 120 S) receives the position coordinates of the human eye and the coordinates of the gaze point of the sightline on the inner side of the windshield or the front window provided by the visual tracking device, when the host vehicle determines that the calculated distance is less than or equal to a preset distance (such as a half of a width of the host vehicle). It should be noted that, if based on the C-V2X technology, the host vehicle calculates the distance between the centroid of the host vehicle and the portable device according to a signal strength RSSI of a received V2X signal of the visual tracking device, or calculates the distance between the centroid of the host vehicle and the portable device according to a high-precision positioning function pre-integrated in the visual tracking device.

It can be understood that the gaze point calculated by the visual tracking device is defined as a three-dimensional position projected by the sightline in a space, and the gaze point needs to be projected on the corresponding screen. Therefore, a vector from a pupil center to a cornea has a corresponding relationship with a spatial point on the projection screen, so that when a matrix defining a position of the screen and the corresponding relationship are obtained, the position of the gaze point on the projection screen can be calculated.

Block S2, the host vehicle screens out a refractive index and a curvature of the current projection screen, and combines with the position coordinates of the human eye and the coordinates of the gaze point of the sightline on the inner side of the current projection screen, obtains coordinates of a gaze point of the sightline on an outer side of the current projection screen and a corresponding refracted light path formed by outward refraction of the sightline, and further combines with a preset normal viewing distance of the human eye, obtains a final gaze point of the sightline on the corresponding refracted light path and coordinates of the final gaze point.

A specific process includes: first, the host vehicle obtains the refractive index and curvature of the current projection screen by searching a preset refractive index and curvature table according to the current projection screen;

Secondly, the host vehicle obtains a direction of the sightline according to the position coordinates of the human eye and the coordinates of the gaze point of the sightline on the inner side of the current projection screen, and obtains the coordinates of the gaze point of the sightline on the outer side of the current projection screen and the corresponding refracted light path formed by outward refraction of the sightline, based on the refractive index of the current projection screen and the direction of the sightline, and obtains the final gaze point of the sightline on the corresponding refracted light path and the coordinates of the final gaze point based on the preset normal viewing distance of the human eye (a default value is 100 m, which can be set according to requirements, or can be automatically adjusted according to weather signals transmitted by a drive test unit RSU).

Figure 2:
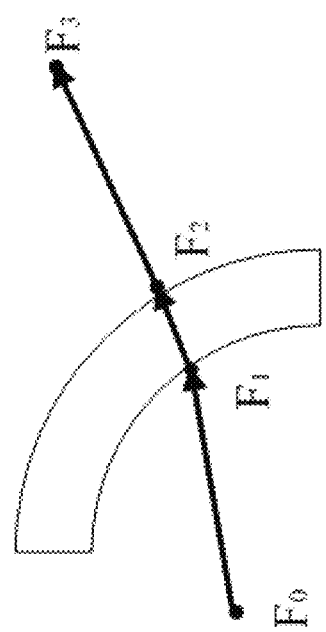
FIG. 2 is a schematic diagram of a scene in which the method for visually tracking the gaze point of the human eye provided by the first embodiment of the present disclosure is applied to a windshield.

In one embodiment, as shown in FIG. 2, the current projection screen projected by the sightline is the windshield, and according to a formula $F_0F_1+F_1F_2+F_2F_3=L_s$, the final gaze point $F_3$ of the sightline and its coordinates are calculated; wherein, $F_0$ represents a position of the human eye; $F_1$ represents a gaze point of the sightline on the inner sider of the windshield calculated by the visual tracking device; that is, both $F_0$ and $F_1$ are known coordinates and can be obtained directly through the visual tracking device;

$F_2$ represents the gaze point of the sightline on the outer side of the windshield; $F_3$ represents the final gaze point of the sightline; Ls represents the preset normal viewing distance of the human eye, and its value is constant. Since the curvature and refractive index of the windshield are fixed values obtained by searching the table, coordinates of $F_2$ and $F_3$ can be calculated according to the refracted light path.

Similarly, when the current projection screen projected by the sightline is the front window of the vehicle, the final gaze point of the sightline on the front window of the vehicle and its coordinates can be calculated.

In the first embodiment of the present disclosure, if it is detected that after the sightline is refracted by the front window of the vehicle, the final gaze point (i.e., the gaze point $F_3$ recited above) is located on a rearview mirror, the host vehicle needs to further perform a calculation of reflection to obtain the final gaze point. Therefore, the method further includes:

If the host vehicle determines that the sightline is first refracted by the front window and then reflected by the rearview mirror, the host vehicle screens out the reflectivity and curvature of the rearview mirror, and in combination with the refracted light path formed by the outward refraction of the sightline through the front window, the host vehicle obtains the coordinates of the gaze point on the rearview mirror after the sightline is refracted and a first reflected light path formed by the sightline after refraction, and the host vehicle further combines the normal viewing distance of the human eye, and obtains the final gaze point of the sightline on the first reflected light path and the coordinates of the final gaze point. It can be understood that, according to the optical principle, it can be known that the front window projected by the sightline corresponds to the rearview mirror.

In one embodiment, according to the formula $F_0F_1+F_1F_2+F_2F_3+F_3F_4=L_s$, the final gaze point $F_4$ of the sightline and its coordinates are calculated; wherein, $F_0$ represents a position of the human eye; $F_1$ represents the gaze point of the sightline on the inner side of the front window calculated by the visual tracking device; that is, both $F_0$ and $F_1$ are known coordinates and can be obtained directly through the visual tracking device;

$F_2$ represents the gaze point of the sightline on the outer side of the front window; $F_3$ represents the gaze point of the sightline on the rearview mirror; $F_4$ represents the final gaze point of the sightline; $L_s$ represents the preset normal viewing distance of the human eye, and its value is constant. Since the curvatures and refractive indexes of the front window and rearview mirror are fixed values obtained by searching the table, coordinates of $F_2$ and $F_3$ can be calculated according to a refracted light path, and coordinates of $F_4$ can be calculated by a reflected light path.

In the first embodiment of the present disclosure, if it is detected that the front window of the vehicle is rolled down (that is, the sightline does not need to be refracted through the front window), so that the sightline is directly projected on the rearview mirror, and the final gaze point after reflection can be obtained by only performing the calculation of reflection. Therefore, the method further includes:

If the host vehicle determines that the sightline is directly reflected by the rearview mirror without being refracted by the front window of the vehicle, the host vehicle receives the coordinates of the gaze point of the sightline on the rearview mirror provided by the visual tracking device, the host vehicle obtains a second reflected optical path directly formed by the sightline on the rearview mirror according to the position coordinates of the human eye and the reflectivity and curvature of the rearview mirror, and the coordinates of the gaze point of the sightline on the rearview mirror, and further obtains the final gaze point and its coordinates of the sightline on the second reflected light path according to the preset normal viewing distance of the human eye.

In one embodiment, according to the formula $F_0F_1+F_1F_2$ $'_2$ $L_s$, the final gaze point $F_2$ of the sightline and its coordinates are calculated; wherein, $F_0$ represents the position of the human eye; $F_1$ represents the gaze point of the sightline on the rearview mirror calculated by the visual tracking device; that is, both $F_0$ and $F_1$ are known coordinates and can be obtained directly through the visual tracking device;

$F_2$ represents the final gaze point of the sightline; $L_s$ represents the preset normal viewing distance of the human eye, and its value is constant. Since the curvature and refractive index of the rearview mirror are fixed values obtained by looking up the table, the coordinates of $F_2$ can be calculated by the reflection of the optical path.

In the first embodiment of the present disclosure, the visual tracking device not only provides visual tracking technology to determine the final gaze point of the sightline, but also has a built-in function of detecting vital signs, which can monitor parameters of vital signs such as a carrier's breathing, pulse, body temperature, etc. According to the above parameters of vital signs, a fatigue state of the carrier is evaluated, so as to carry out a safety warning. For example, the fatigue state includes five states: healthy, mild fatigue, moderate fatigue, severe fatigue, and deep fatigue. Therefore, the method further includes:

The host vehicle periodically receives the fatigue state of the driver of the host vehicle provided by the visual tracking device, and obtains a fatigue degree of the driver according to the fatigue state of the driver, and further, when the fatigue degree of the driver reaches a preset alarm threshold, an alarm signal is generated and sent to the driver of the host vehicle.

It can be seen that the host vehicle not only can periodically receive the fatigue state of the driver provided by the visual tracking device, but also can periodically receive the position coordinates of the human eye of the driver and the coordinates of the gaze point of the sightline on the inner side of the windshield or the front window, and/or the coordinates of the gaze point of the sightline on the rearview mirror (the front window is rolled down at this time) provided by the visual tracking device.

In one embodiment, according to the fatigue state of the driver of the host vehicle sent by the visual tracking device, in a preset mapping table of fatigue state and fatigue degree, the fatigue degree M of the driver is obtained; wherein, each fatigue degree in the mapping table of fatigue state and fatigue degree corresponds to a fatigue state which is assigned a value. For example, the fatigue degree M of the state of healthy is 1, the fatigue degree M of the state of mild fatigue is 2, the fatigue degree M of the state of moderate fatigue is 3, the fatigue degree M of the state of severe fatigue is 4, and the fatigue degree M of the state of deep fatigue is 5.

Once the fatigue degree M of the driver of the host vehicle reaches the preset alarm threshold (such as 5), that is, the driver of the host vehicle is in a state of deep fatigue, the host vehicle sends warning signals which include an alarm screen and/or an alarm sound to a central control interface through a CAN bus or the V2X technology, so as to remind the driver of the host vehicle to pay attention to driving safety.

It is understandable that if the host vehicle receives vehicle information sent by a distant vehicle within a certain period, the host vehicle broadcasts a signal carrying a sign of a vehicle being out-of-control (such as a V2X signal of national standard indicating a vehicle being out-of-control) to the distant vehicle to remind a driver of the distant vehicle. Among them, the vehicle information is used to represent a driving state of a vehicle (such as a driving speed, a driving acceleration, a yaw angle, and a speed direction angle, etc.), and can also represent physical attribute information of the vehicle (such as coordinates of a centroid, an axis of the front wheels, axis of the rear wheels, and an angle of front wheels, etc.).

Figure 3:
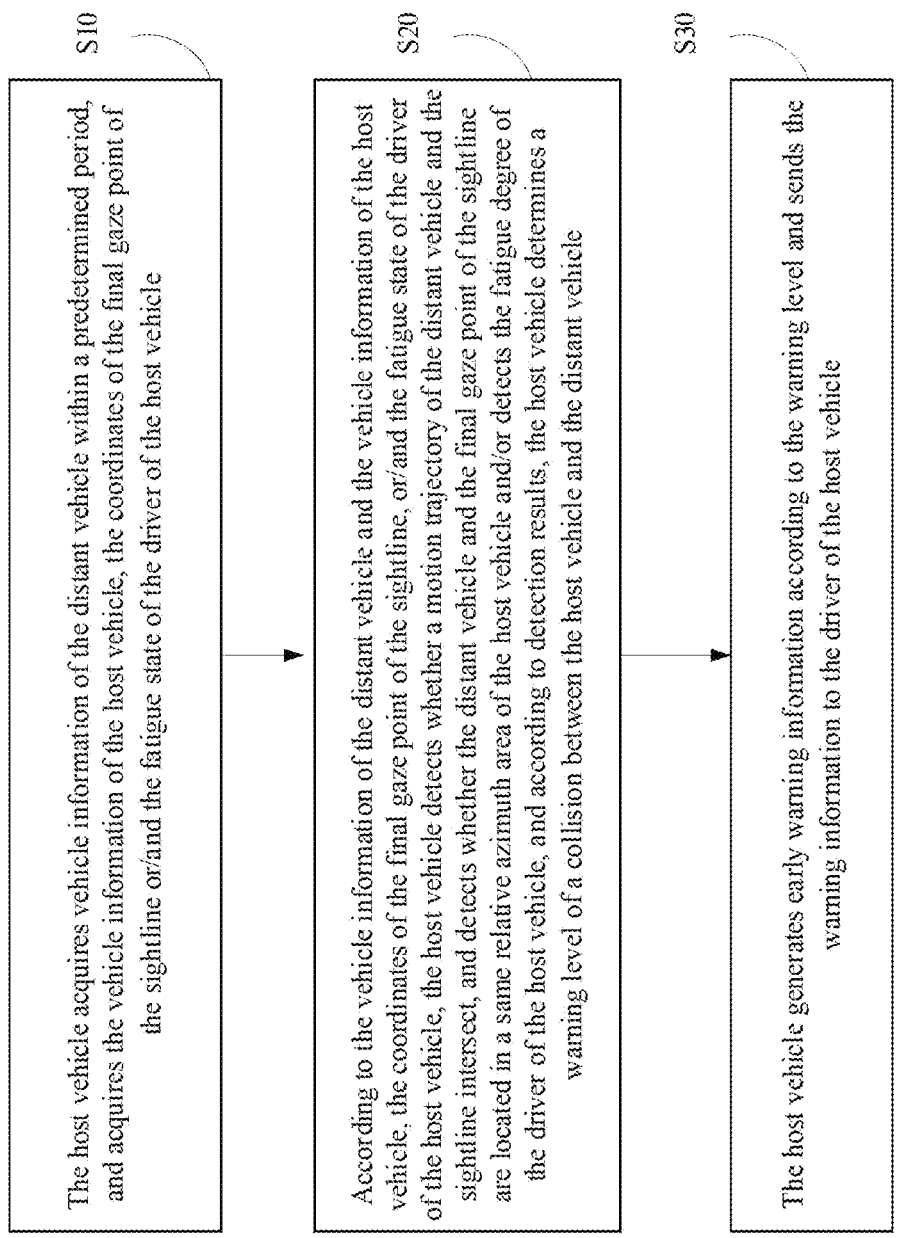
FIG. 3 is a flowchart of a vehicle early warning method provided by a second embodiment of the present disclosure.

Compared with the method for visually tracking the gaze point of the sightline provided in the first embodiment of the present disclosure, as shown in FIG. 3, in a second embodiment of the present disclosure, a vehicle early warning method is also provided, which is used to perform collision warning for the host vehicle based on the final gaze point or/and the fatigue state of the driver of the host vehicle obtained by the method of visually tracking the gaze point of the sightline provided in the first embodiment of the present disclosure, and the method includes the following blocks:

Block S10, the host vehicle acquires vehicle information of the distant vehicle within a predetermined period, and acquires the vehicle information of the host vehicle, the coordinates of the final gaze point of the sightline or/and the fatigue state of the driver of the host vehicle;

A specific process includes, the host vehicle receives the vehicle information of the distant vehicle based on C-V2X technology (such as based on V2X broadcast signal) or other communication technologies (such as radar, camera, etc.) within the predetermined period (such as 120 S), and automatically obtains the vehicle information of the host vehicle, the coordinates of the final gaze point of the sightline, or/and the fatigue state of the driver of the host vehicle.

Block S20, according to the vehicle information of the distant vehicle and the vehicle information of the host vehicle, the coordinates of the final gaze point of the sightline, or/and the fatigue state of the driver of the host vehicle, the host vehicle detects whether a motion trajectory of the distant vehicle and the sightline intersect, and detects whether the distant vehicle and the final gaze point of the sightline are located in a same relative azimuth area of the host vehicle and/or detects the fatigue degree of the driver of the host vehicle, and according to detection results, the host vehicle determines a warning level of a collision between the host vehicle and the distant vehicle;

A specific process includes, first, since vehicle operating parameters include at least one of a vector of a line connecting the centroids of the host vehicle and the distant vehicle, a distance between the centroids of the host vehicle and the distant vehicle, a relative motion trajectory vector of the distant vehicle, a driving speed of the host vehicle, and a driving speed of the distant vehicle, therefore, the host vehicle substitutes the vehicle information of the host vehicle obtained above into a kinematic bicycle model, and obtains a motion equation of the host vehicle, and substitutes the vehicle information of the distant vehicle into the kinematic bicycle model, and obtains a motion equation of the distant vehicle.

In one embodiment, the kinematic bicycle model can be expressed by the following formula or a variant of the formula:

$$\dot{x} = v\cos(\psi + \beta)$$
$$\dot{y} = v\sin(\psi + \beta)$$
$$\dot{\psi} = \frac{v}{l}\sin(\beta)$$
$$\dot{v} = a$$
$$\beta = \tan\left(\frac{l_r}{l_f + l_r}\tan(\delta_f)\right)$$

Figure 4:
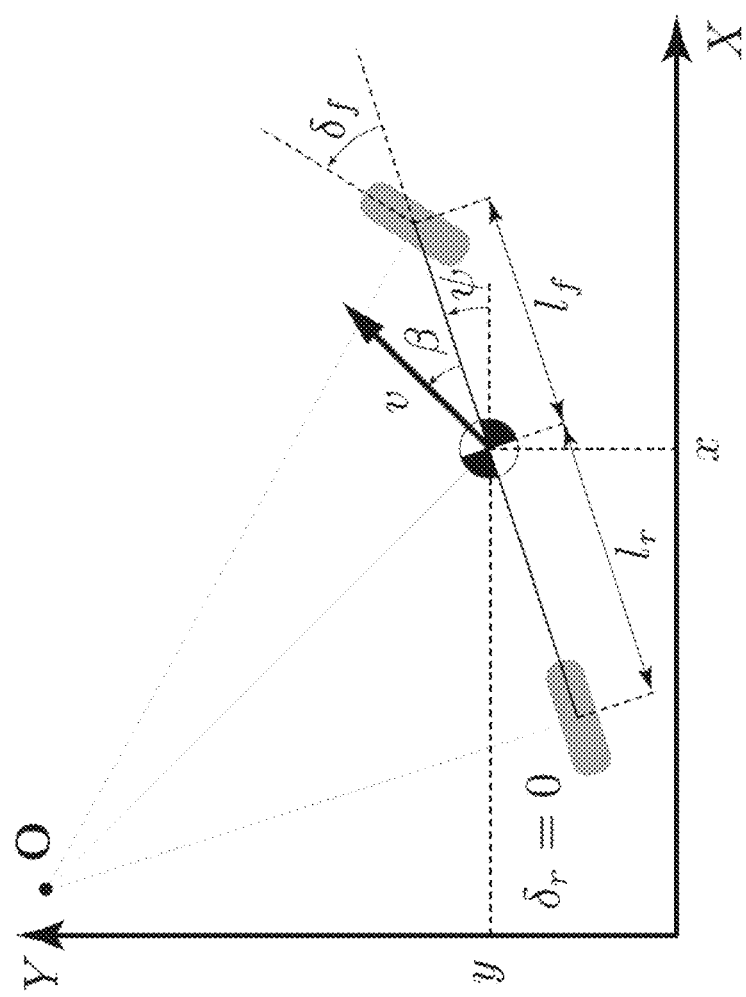
FIG. 4 is a schematic diagram of a parameter relationship of a driving motion equation involved in block S20 in the vehicle early warning method provided by the second embodiment of the present disclosure.

As shown in FIG. 4, x and y respectively represent coordinates of the centroid of the vehicle under inertial coordinates provided by GPS, v represents the driving speed of the vehicle, a represents the driving acceleration of the vehicle, and the driving acceleration of the vehicle and the driving speed of the vehicle in the kinematic bicycle model keep a same orientation. $\psi$ represents the yaw angle of the vehicle, $\beta$ represents a direction angle of the driving speed of the vehicle, $l_r$ represents a vertical distance between the coordinates of the centroid of the vehicle and the axis of the rear wheels, $l_f$ represents a vertical distance between the coordinates of the centroid of the vehicle and the axis of the front wheels. $\delta_f$ represents the angle of front wheels of the vehicle, which can be calculated by multiplying an angle of a steering wheel by a transmission ratio. Since most of the rear wheels of the vehicle cannot change direction, it is assumed that $\delta_r$ is to be 0.

The host vehicle substitutes the vehicle information of the host vehicle and the vehicle information of the distant vehicle into the above discretized kinematic bicycle model separately, and obtains the motion equation of the host vehicle and the motion equation of the distant vehicle. Here, A represents the host vehicle and B represents the distant vehicle.

Optionally, the motion equation of the host vehicle A at time t can be expressed by the following formula or a variant of the formula:

$$x_{A,t_n} = x_{A,t_{n-1}} + v_{A,t_{n-1}}\cos(\psi_{A,t_{n-1}} + \beta_A)\Delta t$$
$$y_{A,t_n} = y_{A,t_{n-1}} + v_{A,t_{n-1}}\sin(\psi_{A,t_{n-1}} + \beta_A) \times \Delta t$$
$$\psi_{A,t_n} = \psi_{A,t_{n-1}} + \frac{v_{A,t_{n-1}}}{l_{r,A}}\sin(\beta_A) \times \Delta t$$
$$v_{A,t_n} = v_{A,t_{n-1}} + a_A \times \Delta t$$
$$\beta_A = \tan^{-1}\left(\frac{l_{r,A}}{l_{f,A} + l_{r,A}}\tan(\delta_{f,A})\right)$$

When n equals 0:

$$x_{A,t_0} = x_A$$
$$y_{A,t_0} = y_A$$
$$v_{A,t_0} = v_A$$

Similarly, the motion equation of the distant vehicle B at time t can be expressed by the following formula or a variant of the formula:

$$x_{B,t_n} = x_{B,t_{n-1}} + v_{B,t_{n-1}}\cos(\psi_{B,t_{n-1}} + \beta_b)\Delta t$$
$$y_{B,t_n} = y_{B,t_{n-1}} + v_{B,t_{n-1}}\sin(\psi_{B,t_{n-1}} + \beta_b) \times \Delta t$$
$$\psi_{B,t_n} = \psi_{B,t_{n-1}} + \frac{v_{B,t_{n-1}}}{l_{r,B}}\sin(\beta_B) \times \Delta t$$
$$v_{B,t_n} = v_{B,t_{n-1}} + a_B \times \Delta t$$
$$\beta_B = \tan^{-1}\left(\frac{l_{r,B}}{l_{f,B} + l_{r,B}}\tan(\delta_{f,B})\right)$$

When n equals 0:

$$x_{B,t_0} = x_B$$
$$y_{B,t_0} = y_B$$
$$v_{B,t_0} = v_B$$

The subscripts A and B in the embodiments of the present disclosure respectively represent corresponding parameters of the host vehicle A and the distant vehicle B, and the coordinates $A(x_A, y_A)$ and the coordinates B $(x_B, y_B)$ respectively represent the coordinates of the centroids of the host vehicle A and the distant vehicle B; and $\Delta t$ represent an unit time step.

Note that the above parameters are defined in the V2X national standard, which are the own signals in the V2X signals. If some signals are missing, an alternative value can be used. For example, let $$l_r = l_f = \frac{l_r + l_f}{2} = \frac{L}{2},$$

L represents a length of a body of the vehicle, which is a required signal for V2X.

Figure 5:
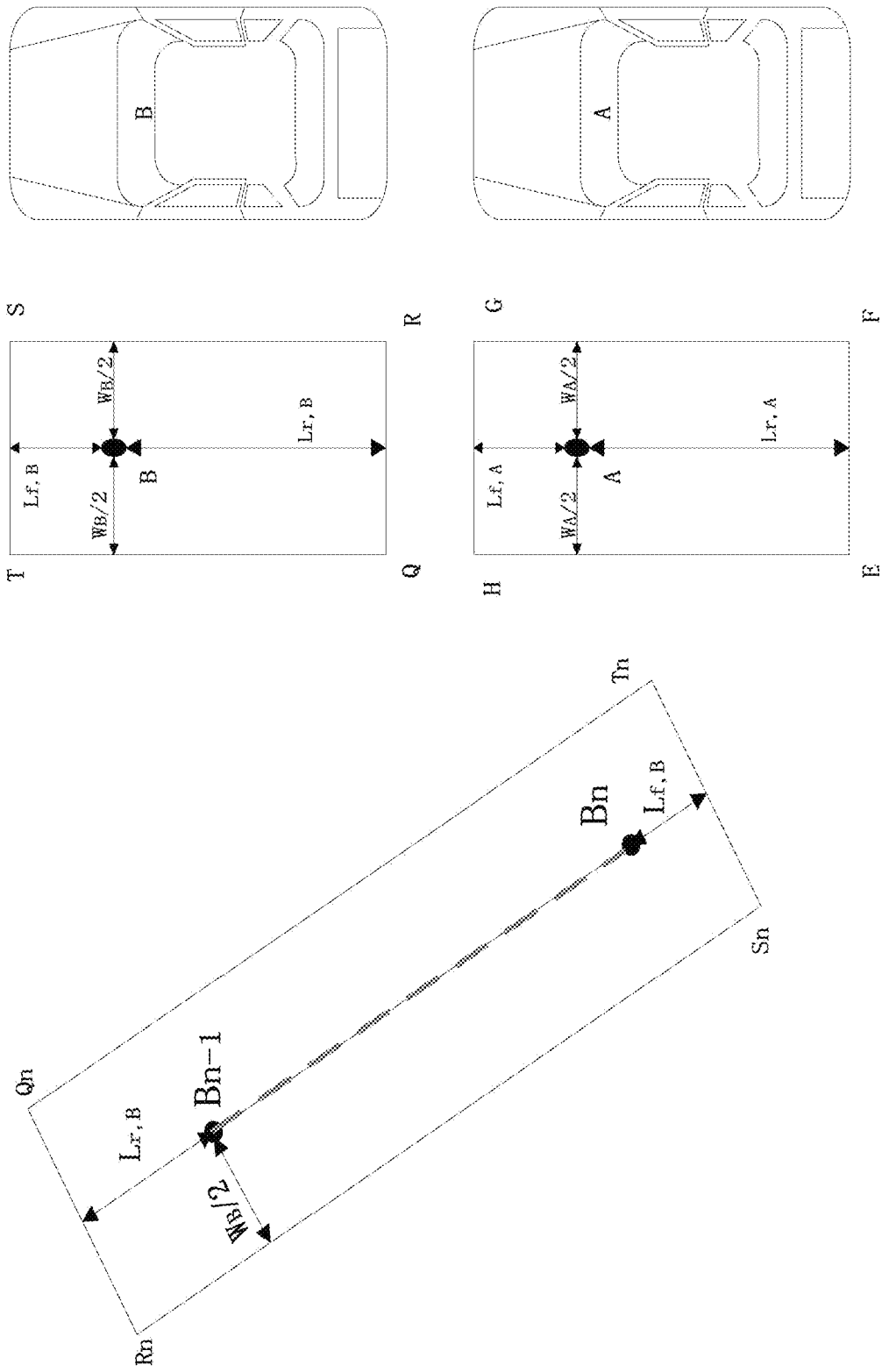
FIG. 5 is a schematic diagram of a parameter vector relationship between a rectangular model of a host vehicle and a rectangular model of a distant vehicle involved in block S20 in the vehicle early warning method provided by the second embodiment of the present disclosure.

Second, according to the vehicle information of the host vehicle and the vehicle information of the distant vehicle, a rectangle model of the host vehicle and the rectangle model of the distant vehicle are constructed;

In one embodiment, for a vehicle, the rectangular model of the vehicle can be calculated and its position can be determined by knowing the coordinates of the centroid, the length and width of the body of the vehicle, and a heading angle. As shown in FIG. 5, according to the vehicle's own coordinate information and body parameter information (the length and width of the vehicle are known, and the coordinates of the centroid of the host vehicle A and the coordinates of the centroid of the distant vehicle B are known). The rectangular model QRST of the distant vehicle B and the rectangular model EFGH of the host vehicle A can be determined. Since the two vehicles are basically at a same altitude when a collision occurs, only 2D scenes are considered in this disclosure.

Third, in the motion equation of the host vehicle and the motion equation of the distant vehicle, the vehicle information of the host vehicle and the vehicle information of the distant vehicle are mathematically and physically calculated to determine the operating parameters corresponding to each moment; among them, the operating parameters can describe the motion trajectory state of the host vehicle, and the motion trajectory state of the distant vehicle, and the relative motion trajectory state of the two vehicles. For example, the driving speed of the distant vehicle relative to the host vehicle can be obtained based on the driving speed of the host vehicle and the driving speed of the distant vehicle.

Therefore, the operating parameters can also describe individual motion trajectory states of the two rectangular models, and can also describe the relative motion trajectory states of the two rectangular models.

Figure 6:
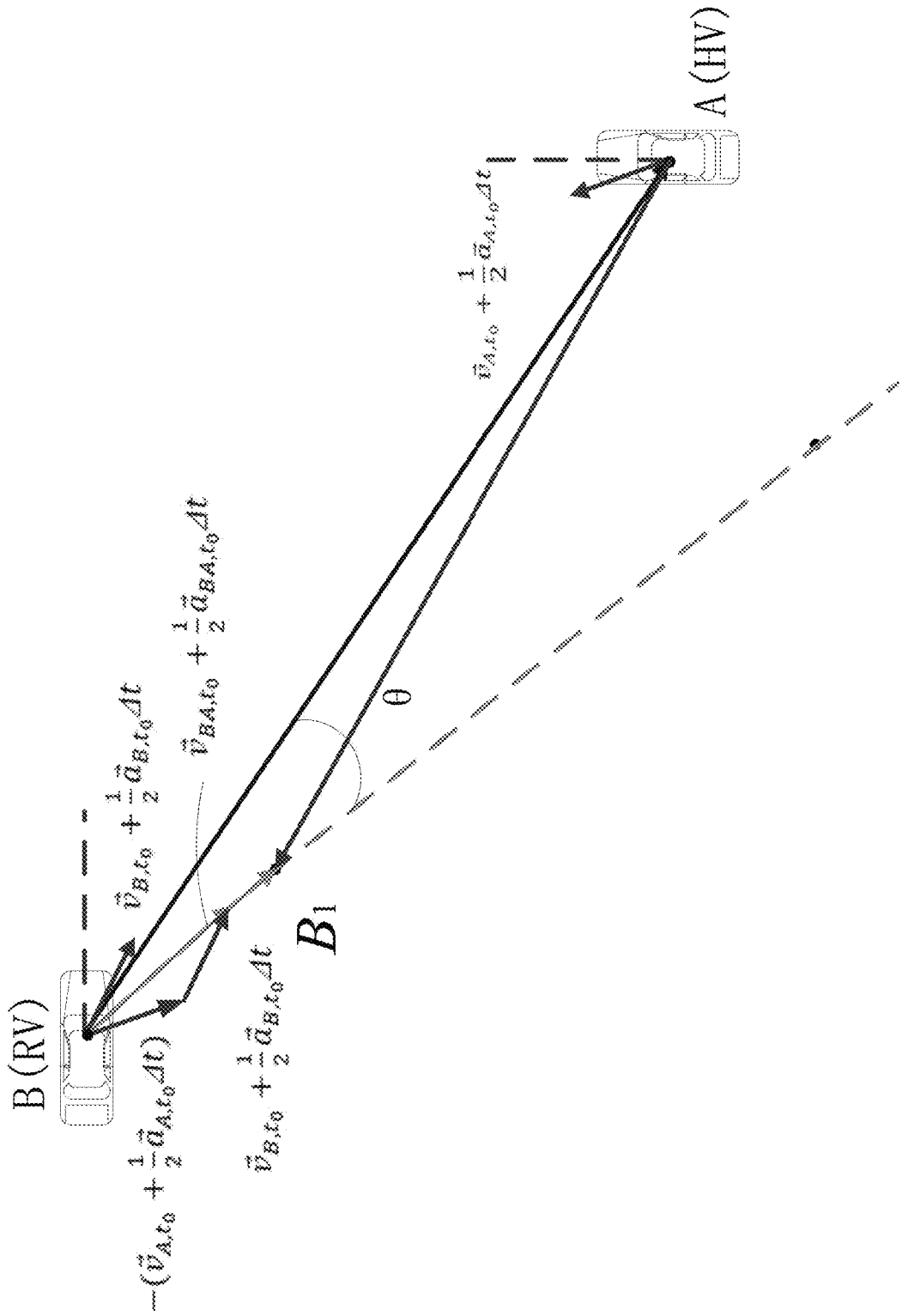
FIG. 6 is a schematic diagram of a relative motion relationship between the host vehicle and the distant vehicle at a first moment involved in block S20 in the vehicle early warning method provided by the second embodiment of the present disclosure.
Figure 7:
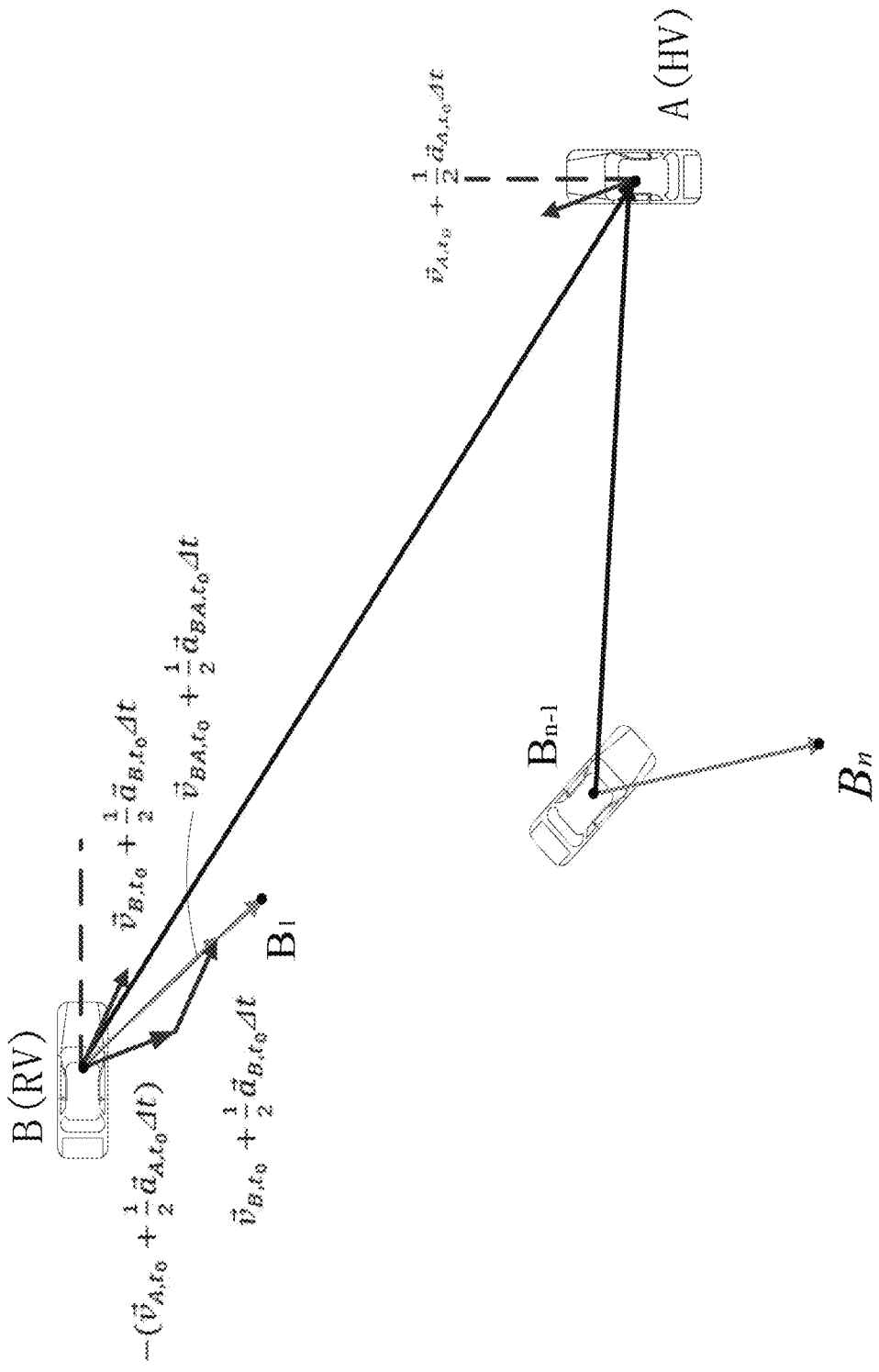
FIG. 7 is a schematic diagram of a relative motion relationship between the host vehicle and the distant vehicle at time n involved in block S20 in the vehicle early warning method provided by the second embodiment of the present disclosure.

In one embodiment, as shown in FIG. 6 and FIG. 7, point A is used as a reference point for relative motion and remains stationary, and the motion trajectory of point B relative to A is calculated by a vector method. At this time, the relative driving speed and the relative driving acceleration are expressed as follows:

$$\vec{v}_{BA} = \vec{v}_B - \vec{v}_A$$

$$\vec{a}_{BA} = \vec{a}_B - \vec{a}_A$$

And according to the coordinates $B_t$ of the distant vehicle B relative to the host vehicle A at time t, then an expression of the relative motion trajectory vector $\overrightarrow{BB_1}$ at a first moment is:

$$\overrightarrow{BB_1} = \left(\vec{v}_{BA,t_0} + \frac{1}{2}\vec{a}_{BA,t_0}\Delta t\right)\Delta t = \left(\vec{v}_{B,t_0} + \frac{1}{2}\vec{a}_{B,t_0}\Delta t\right)\Delta t - \left(\vec{v}_{A,t_0} + \frac{1}{2}\vec{a}_{A,t_0}\Delta t\right);$$

where $\Delta t$ represents a time interval, i.e., the unit time step.

According to the kinematic bicycle model, a direction of the acceleration does not change, and a direction of the relative acceleration $\vec{a}_{BA}$ and a direction of the relative speed $\vec{V}_{BA}$ of the vehicle are not necessarily in a same direction, so $$\left(\vec{v}_{BA,t_0} + \frac{1}{2}\vec{a}_{BA,t_0}\Delta t\right)$$

is used to draw a vector $\overrightarrow{BB_1}$ in FIG. 6 and FIG. 7.

$(x_{BA,t_1}, y_{BA,t_1})$ is defined as the coordinates of point $B_1$, it can be obtained by the following vector calculation:

$$x_{BA,t_1} = x_{BA,t_0} + v_{BA,x,t_0}\Delta t + \frac{1}{2}a_{BA,x,t_0}\Delta t^2$$

$$y_{BA,t_1} = y_{BA,t_0} + v_{BA,y,t_0}\Delta t + \frac{1}{2}a_{BA,y,t_0}\Delta t^2$$

$$x_{BA,t_0} = x_B$$

$$v_{BA,x,t_0} = v_{B,t_0}\cos(\psi_{B,t_0} + \beta_B) - v_{A,t_0}\cos(\psi_{A,t_0} + \beta_A)$$

$$a_{BA,x,t_0} = a_B\cos(\psi_{B,t_0} + \beta_B) - a_A\cos(\psi_{A,t_0} + \beta_A)$$

wherein, $y_{BA,t_0} = y_B$;

$v_{BA,y,t_0} = v_{B,t_0}\sin(\psi_{B,t_0}+\beta_B) - v_{A,t_0}\sin(\psi_{A,t_0}+\beta_A)$ $a_{BA,y,t_0} = a_B\sin(\psi_{B,t_0}+\beta_B) - a_A\sin(\psi_{A,t_0}+\beta_A)$ Similarly, $(x_{BA,t_n}, y_{BA,t_n})$ is defined to be coordinates of point $B_n$, it can be obtained by the following vector calculation:

$$x_{BA,t_n} = x_{BA,t_{n-1}} + v_{BA,x,t_{n-1}}\Delta t + \frac{1}{2}a_{BA,x,t_{n-1}}\Delta t^2$$

$$y_{BA,t_n} = y_{BA,t_{n-1}} + v_{BA,y,t_{n-1}}\Delta t + \frac{1}{2}a_{BA,y,t_{n-1}}\Delta t^2$$

Wherein, $$v_{BA,x,t_{n-1}} = v_{B,t_{n-1}}\cos(\psi_{B,t_{n-1}} + \beta_B) - v_{A,t_{n-1}}\cos(\psi_{A,t_{n-1}} + \beta_A)$$

$$a_{BA,x,t_{n-1}} = a_B\cos(\psi_{B,t_{n-1}} + \beta_B) - a_A\cos(\psi_{A,t_{n-1}} + \beta_A)$$

$$v_{BA,y,t_{n-1}} = v_{B,t_{n-1}}\sin(\psi_{B,t_{n-1}} + \beta_B) - v_{A,t_{n-1}}\sin(\psi_{A,t_{n-1}} + \beta_A)$$

$$a_{BA,y,t_{n-1}} = a_B\sin(\psi_{B,t_{n-1}} + \beta_B) - a_A\sin(\psi_{A,t_{n-1}} + \beta_A)$$

$$\psi_{A,t_{n-1}} = \psi_{A,t_{n-2}} + \frac{v_{A,t_{n-2}}}{l_{r,A}}\sin(\beta_A) \times \Delta t$$

$$v_{A,t_{n-1}} = v_{A,t_{n-2}} + a_A \times \Delta t$$

$$\psi_{B,t_{n-1}} = \psi_{B,t_{n-2}} + \frac{v_{B,t_{n-2}}}{l_{r,B}}\sin(\beta_B) \times \Delta t$$

$$v_{B,t_{n-1}} = v_{B,t_{n-2}} + a_B \times \Delta t$$

$$x_{BA,t_n} = x_{BA,t_{n-1}} + v_{BA,x,t_{n-1}}\Delta t + \frac{1}{2}a_{BA,x,t_{n-1}}\Delta t^2 =$$

$$x_{B,t_{n-1}} - x_{A,t_{n-1}} + \left(v_{B,t_{n-1}}\cos(\psi_{B,t_{n-1}} + \beta_B) - v_{A,t_{n-1}}\cos(\psi_{A,t_{n-1}} + \beta_A)\right)\Delta t$$

$$y_{BA,t_n} = y_{BA,t_{n-1}} + v_{BA,y,t_{n-1}}\Delta t + \frac{1}{2}a_{BA,x,t_{n-1}}\Delta t^2 =$$

$$y_{B,t_{n-1}} - y_{A,t_{n-1}} + \left(v_{B,t_{n-1}}\sin(\psi_{B,t_{n-1}} + \beta_B) - v_{A,t_{n-1}}\sin(\psi_{A,t_{n-1}} + \beta_A)\right)\Delta t.$$

Fourth: According to the operating parameters and the coordinates of the final gaze point of the sightline, whether the distant vehicle and the final gaze point of the sightline are located in the same relative azimuth area of the host vehicle are detected, and whether the motion trajectory of the rectangle model of the distant vehicle intersects with the sightline is detected; and/or the fatigue degree of the driver of the host vehicle is detected according to the fatigue state of the driver of the host vehicle;

In one embodiment, whether the two are located in the same relative orientation area of the host vehicle is determined according to the GPS inertial coordinates of the final gaze point of the sightline and the GPS inertial coordinates of the host vehicle. Whether the motion trajectory of the rectangle model of the distant vehicle intersects with the sightline can be determined by calculating whether a line segment AJ in FIG. 8 intersects with a rectangle $Q_n R_n S_n T_n$, formed by the rectangle model of the distant vehicle B. At this time, it is necessary to determine whether the line segment AJ intersects with each side that is intersecting the rectangle $Q_n R_n S_n T_n$; where A represents the centroid of the host vehicle A, and J represents the final gaze point of the sightline. It should be noted that if the line segment AJ intersects with the rectangle $Q_n R_n S_n T_n$, it can be considered that the driver of the host vehicle is currently looking at the distant vehicle B; otherwise, it is considered that the driver of the host vehicle fails to notice the distant vehicle B. The visual tracking device cannot directly determine whether a gaze point of a scene is on the distant vehicle B, and a position of the rectangle $Q_n R_n S_n T_n$ is a pre-judgment value after iteration, and the coordinates of the final gaze point J of the sightline remain unchanged during the iterative calculation, that is, it is a fixed value.

Taking whether a line segment AB and a line segment CD intersect as an example, it is determined whether the line segment AJ intersects with each edge intersecting the rectangle $Q_n R_n S_n T_n$ in turn. The specific method is as follows:

The line segment A(x1, y1) B(x2, y2) and the line segment C(x3, y3) D(x4, y4) are known, an equation of a straight line where the two line segments AB and CD are located is expressed using a parametric equation are following:

$$\begin{cases} x = x_1 + \lambda(x_2 - x_1) \\ y = y_1 + \lambda(y_2 - y_1) \end{cases} \begin{cases} x = x_3 + \mu(x_4 - x_3) \\ y = y_3 + \mu(y_4 - y_3) \end{cases}$$

If there is an intersection between the two line segments, parameters $\lambda$ and $\mu$ are solved based on the equations:

$$(x_2-x_1)\lambda - (x_4-x_3)\mu = x_3 - x_1$$

$$(y_2-y_1)\lambda - (y_4-y_3)\mu = y_3 - y_1$$

Let the vector:

$u = (x_2-x_1, y_2-y_1) = AB$ vector, $v = (x_4-x_3, y_4-y_3) = CD$ vector, $w = (x_3-x_1, y_3-y_1) = AC$ vector;

Solving for $\lambda$, and $\mu$, and get:

$$\begin{cases} \lambda = \begin{vmatrix} x_3 - x_1 & -(x_4 - x_3) \\ y_3 - y_1 & -(y_4 - y_3) \end{vmatrix} / \det = -\text{cross}(w, v)/\det = \text{cross}(v, w)/\det \\ \mu = \begin{vmatrix} x_2 - x_1 & x_3 - x_1 \\ y_2 - y_1 & y_3 - y_1 \end{vmatrix} / \det = \text{cross}(w, v)/\det \end{cases}$$

$$\det = \begin{vmatrix} x_2 - x_1 & -(x_4 - x_3) \\ y_2 - y_1 & -(y_4 - y_3) \end{vmatrix} = -(u_x v_y - v_x u_y) = -\text{cross}(u, v)$$

Wherein,

When $\det \neq 0$, values of $\lambda$ and $\mu$ being between [0,1], indicates that the two line segments have an intersection, and the values of $\lambda$ and $\mu$ being outside [0,1], indicates that the two line segments have no intersection;

When $\det \neq 0$, it means that the two line segments are parallel or collinear, and a special processing method is required to calculate:

First, calculating $\vec{BC} \times \vec{CD}$, if $\vec{BC} \times \vec{CD} = 0$, it means that the two line segments are collinear and may intersect, and further calculation is required. Otherwise, it means that the two line segments are parallel and not collinear, and it is impossible to intersect, and a next calculation is not required. In the case of collinearity, the coordinates of the four points of ABCD can be sorted according to x coordinates from a smallest to a largest (when the line segments are parallel to the y-axis, the y coordinates are used to sort the four points), and then an order of positions of the four coordinates can be judged, so as to obtain whether there is an overlapping part, and if there is the overlapping part, it indicates that the two line segments intersect.

According to the fatigue state of the driver of the host vehicle, the fatigue degree M of the driver of the host vehicle is detected in the preset mapping table of fatigue state and fatigue degree.

Five, if the motion trajectory of the rectangle model of the distant vehicle does not intersect with the sightline, and the final gaze point of the sightline and the distant vehicle are not located in the same relative azimuth area of the host vehicle, and/or the fatigue degree of the driver of the host vehicle is greater than a first threshold, a warning time is adjusted; otherwise, the warning time is maintained;

In one embodiment, if the detecting of whether the motion trajectory of the distant vehicle and the sightline intersect, and the detecting of whether the final gaze point of the distant vehicle and the sightline is located in the same relative azimuth area of the host vehicle are need to performed, the warning time is adjusted according to a formula $$t_w = \frac{t_{w0}}{1 + \frac{|B_n J|}{R_w} K};$$

Among them, $t_w$ represents the adjusted warning time; $t_{w0}$ represents an initial warning time; $R_w$ represents a warning distance; $|B_n J|$ represents a distance of a line vector between position coordinates $B_n$ of the distant vehicle relative to the host vehicle and the coordinates J of the final gaze point of the sightline at time $t_n$, where, if the motion trajectory of the rectangular model of the distant vehicle and the sightline intersect, then $|B_n J| = 0$; K equals 1 or 2, where if the final gaze point of the sightline and the distant vehicle are located in the same relative azimuth area of the host vehicle, then, K=1, otherwise K=2. It can be seen that the farther the coordinates J of the final gaze point of the sightline being from the pre-judgment coordinate $B_n$ of the distant vehicle, the larger the $|B_n J|$ is, and the less reaction time is left for the drive of the host vehicle.

In another embodiment, if only the fatigue degree of the driver of the host vehicle is need to be detected, the warning time is adjusted according to a formula $$t_w = \frac{t_{w0}}{M};$$

where, $t_w$ represents the adjusted warning time; $t_{w0}$ represents the initial warning time; M represents the fatigue degree, and M is a positive integer, a value range of M is [1, 5]; the first threshold equals 1. It can be seen that the higher the fatigue degree M of the driver of the host vehicle is, the shorter the reaction time left for the driver of the host vehicle.

In another embodiment, if the detecting of whether the motion trajectory of the distant vehicle and the sightline intersect, the detecting of whether the distant vehicle and the final gaze point of the sightline are located in the same relative azimuth area of the host vehicle, and the detecting of the fatigue degree of the driver of the host vehicle are all need to be performed, the warning time is adjusted according to a formula $$t_w = \frac{t_{w0}}{M + \frac{|B_n J|}{R_w} K};$$

Among them, $t_w$ represents an adjusted warning time; $t_{w0}$ represents an initial warning time; M represents the fatigue degree of the driver of the host vehicle, which is a positive integer, a value range of M is [1, 5]; the first threshold equals 1; $R_w$ represents the warning distance; $|B_n J|$ represents a distance of a line vector between position coordinates $B_n$ of the distant vehicle relative to the host vehicle and the coordinates J of the final gaze point of the sightline at time $t_Z$, where, if the motion trajectory of the rectangular model of the distant vehicle and the sightline intersect, then $|B_n J|=0$; K equals 1 or 2, where if the final gaze point of the sightline and the distant vehicle are located in the same relative azimuth area of the host car, then, K=1, otherwise K=2. It can be seen that the farther the coordinates J of the final gaze point of the sightline being from the pre-judgment coordinate $B_n$ of the distant vehicle, the larger the $|B_n J|$ is, and the less reaction time is left for the driver of the host vehicle. Similarly, the higher the fatigue degree M of the driver of the host vehicle is, the shorter the reaction time left for the driver of the host vehicle.

It should be noted that the calculation method of the warning distance $R_w$ is as follows: first, according to the coordinates of the centroid of the host vehicle, the axis of the front wheels of the host vehicle and the axis of the rear wheels of the host vehicle, an around area of the host vehicle is divided into a plurality of areas; second, a head angle of the distant vehicle relative to a head direction of the host vehicle is determined according to the head direction of the host vehicle and a head direction of the distant vehicle; finally, the initial warning distance $R_w$ is determined according to a distribution of the coordinates of the centroid of the distant vehicle in each area and the head angle.

In one embodiment, a corresponding relationship between sub-areas, the formula of determining the early warning distance, and the head angle is shown in below Table 1:

| Relative position area | $R_w$ |
|---|---|
| Front right | $R_{w1}$, $\theta_{rel} \in [0°, 180°) \cup (270°, 360°]$ |
| | $R_{w2}$, $\theta_{rel} \in [180°, 270°]$ |
| Right side | $R_{w3}$, $\theta_{rel} \in [0°, 60°) \cup [300°, 360°]$ |
| | $R_{w4}$, $\theta_{rel} \in (120°, 240°)$ |
| | $R_{w5}$, $\theta_{rel} \in [60°, 120°] \cup [240°, 300°]$ |

-continued

| Relative position area | $R_w$ |
|---|---|
| Right front | $R_{w6}$, $\theta_{rel} \in [60°, 120°]$ |
| | $R_{w7}$, $\theta_{rel} \in [240°, 300°]$ |
| | $R_{w8}$, $\theta_{rel} \in [0°, 60°) \cup (120°, 240°)$ |
| | $\cup [300°, 360°]$ |
| Front left | $R_{w1}$, $\theta_{rel} \in (0°, 270°)$ |
| | $R_{w2}$, $\theta_{rel} \in [270°, 360°]$ |
| Left side | $R_{w3}$, $\theta_{rel} \in (120°, 240°)$ |
| | $R_{w4}$, $\theta_{rel} \in [0°, 60°) \cup [300°, 360°]$ |
| | $R_{w5}$, $\theta_{rel} \in [60°, 120°] \cup [240°, 300°]$ |
| Back left | $R_{w9}$, $\theta_{rel} \in (0°, 270°)$ |
| | $R_{w10}$, $\theta_{rel} \in [270°, 360°]$ |
| Right behind | $R_{w11}$, $\theta_{rel} \in [60°, 120°]$ |
| | $R_{w12}$, $\theta_{rel} \in [240°, 300°]$ |
| | $R_{w13}$, $\theta_{rel} \in [0°, 60°) \cup [300°, 360°]$ |
| Back right | $R_{w9}$, $\theta_{rel} \in [0°, 180°) \cup (270°, 360°]$ |
| | $R_{w10}$, $\theta_{rel} \in [180°, 270°]$ |

Among them, all the calculation formulas of $R_w$ are as follows:

$$R_w = R_{w1} = \sqrt{L_{f,A}^2 + \left(\frac{1}{2}W_A\right)^2} + \sqrt{L_{r,B}^2 + \left(\frac{1}{2}W_B\right)^2}$$

$$R_w = R_{w2} = \sqrt{L_{f,A}^2 + \left(\frac{1}{2}W_A\right)^2} + \sqrt{L_{f,B}^2 + \left(\frac{1}{2}W_B\right)^2}$$

$$R_w = R_{w3} = \frac{1}{2}W_A + L_{f,B}$$

$$R_w = R_{w4} = \frac{1}{2}W_A + L_{r,B}$$

$$R_w = R_{w5} = \frac{1}{2}W_A + \frac{1}{2}W_B + \Delta L$$

$$R_w = R_{w6} = L_{f,A} + L_{r,B}$$

$$R_w = R_{w7} = L_{f,A} + L_{f,B}$$

$$R_w = R_{w8} = L_{f,A} + \frac{1}{2}W_B + \Delta L$$

$$R_w = R_{w9} = \sqrt{L_{r,A}^2 + \left(\frac{1}{2}W_A\right)^2} + \sqrt{L_{f,B}^2 + \left(\frac{1}{2}W_B\right)^2}$$

$$R_w = R_{w10} = \sqrt{L_{r,A}^2 + \left(\frac{1}{2}W_A\right)^2} + \sqrt{L_{r,B}^2 + \left(\frac{1}{2}W_B\right)^2}$$

$$R_w = R_{w11} = L_{r,A} + L_{f,B}$$

$$R_w = R_{w12} = L_{r,A} + L_{r,B}$$

$$R_w = R_{w13} = L_{r,A} + \frac{1}{2}W_B + \Delta L$$

Among them, $\theta_{ref}$ represents the head angle. $L_{f,A}$ represents a vertical distance between the coordinates of the centroid of the host vehicle and the axis of the front wheels of the host vehicle, $L_{r,A}$ represents a vertical distance between the coordinates of the centroid of the host vehicle and the axis of the rear wheels of the host vehicle, $L_{f,B}$ represents a vertical distance between the coordinates of the centroid of the distant vehicle and the axis of the front wheels of the distant vehicle, $L_{r,B}$ represents a vertical distance between the coordinates of the centroid of the distant vehicle and the axis of the rear wheels of the distant vehicle, $W_A$ represents a width of the host vehicle, $W_B$ represents a width of the distant vehicle; $\Delta L$ represents a reserved distance.

Figure 9A:
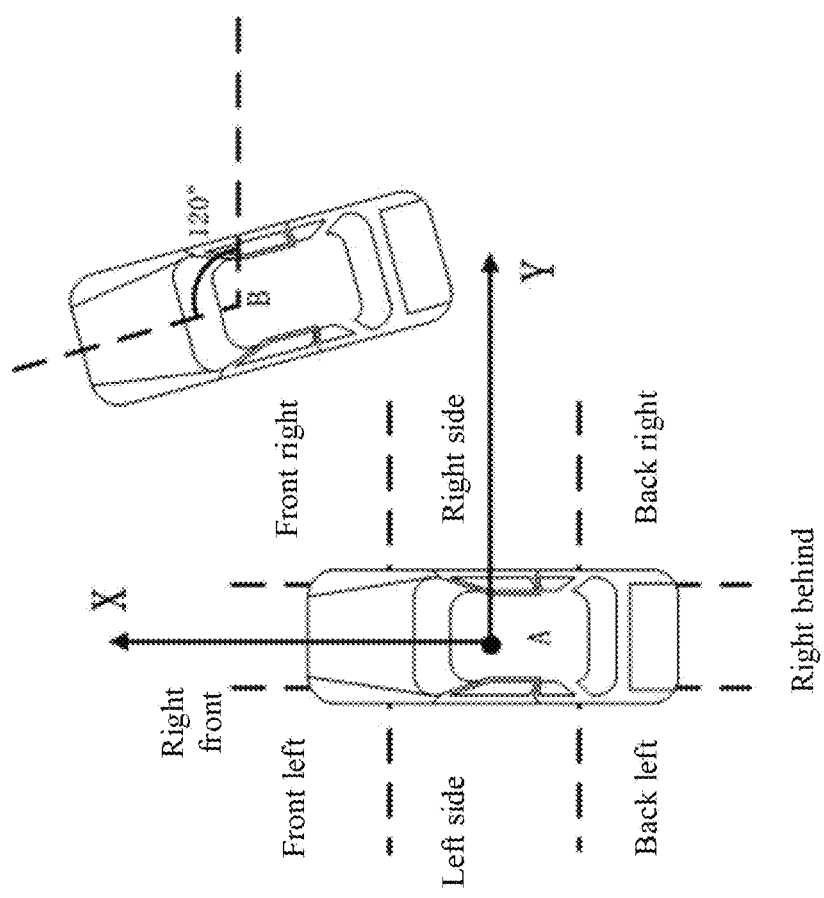
FIG. 9a and FIG. 9b are schematic diagrams of a relative orientation of the host vehicle and the distant vehicle involved in block S20 in the vehicle early warning method provided by the second embodiment of the present disclosure.
Figure 9B:
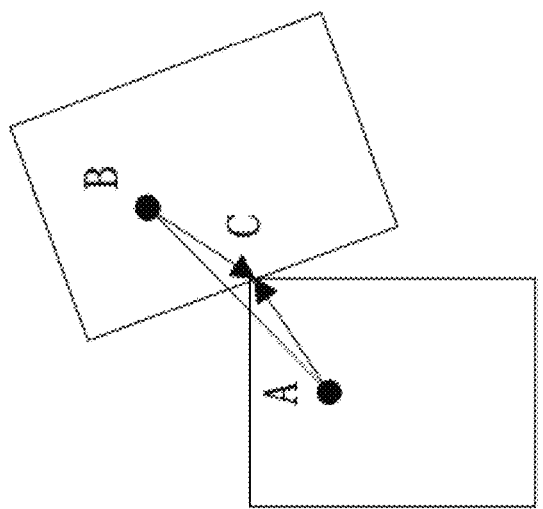

As shown in FIGS. 9a~9b, a new coordinate system is established on the centroid A of the host vehicle, and a positive direction of a X-axis is kept in the same direction as the head direction of the host vehicle, such that a new coordinate system relative to the host vehicle can be obtained, an orientation of the distant vehicle relative to the host vehicle and an angle of the distant vehicle relative to the host vehicle can be calculated. The angle of the new coordinate system is set to be positive in a counter-clockwise direction, the positive direction of the Y-axis is 0°, and the head angle $\theta_{rel}$ between the head direction of the distant vehicle and the head direction of the host vehicle shown in FIG. 9b equals 120°. In order to calculate the distance at which the two vehicles just collide, both vehicles are regarded as rectangles with widths $W_A$ and $W_B$, respectively. The definitions of $L_f$ and $L_r$ are consistent with those in the kinematic bicycle model.

Taking the distant vehicle being at right front of the host vehicle as an example, the two vehicles are in contact at point C in an upper right corner of vehicle A, and |AB| represents a distance between the centroids of the two vehicles, obviously |AB|<|AC|+|BC|. Therefore, for safety reasons, |AC|+|BC| is used as the warning distance $R_{w0}$. Since |AC| is constant and a maximum value of |BC| is $$\sqrt{L_{r,B}^2 + \left(\frac{1}{2}W_B\right)^2}, \text{ then } R_w = \sqrt{L_{f,A}^2 + \left(\frac{1}{2}W_A\right)^2} + \sqrt{L_{r,B}^2 + \left(\frac{1}{2}W_B\right)^2}.$$

According to a difference in the head angle between the two vehicles, then:

$$R_w = R_{w1} = \sqrt{L_{f,A}^2 + \left(\frac{1}{2}W_A\right)^2} + \sqrt{L_{r,B}^2 + \left(\frac{1}{2}W_B\right)^2}, \theta_{rel} \in [0°, 180°) \cup (270°, 360°]$$

$$R_w = R_{w2} = \sqrt{L_{f,A}^2 + \left(\frac{1}{2}W_A\right)^2} + \sqrt{L_{f,B}^2 + \left(\frac{1}{2}W_B\right)^2}, \theta_{rel} \in [180°, 270°]$$

However, if the warning distance is too large, the system may generate some unnecessary warnings and false alarms. For example, vehicle A and vehicle B are driving in the same direction in adjacent lanes (or driving in the opposite direction, two vehicles are still considered to be driving in the same direction if the head angle between the head directions of the two vehicles is less than or equal to 30°, the same is true for the two vehicles driving in the opposite direction), vehicle B is on a right side relative to vehicle A, at this time, the early warning distance should be equal to a lateral distance between the two vehicles, that is $$R_w = \frac{1}{2}W_A + \frac{1}{2}W_B + \Delta L;$$

similarly, according to the change of the head angle of the head directions of the two vehicles, the following are get:

$$R_w = R_{w3} = \frac{1}{2}W_A + L_{f,B}, \theta_{rel} \in [0°, 60°) \cup [300°, 360°]$$

$$R_w = R_{w4} = \frac{1}{2}W_A + L_{r,B}, \theta_{rel} \in (120°, 240°)$$

$$R_w = R_{w5} = \frac{1}{2}W_A + \frac{1}{2}W_B + \Delta L, \theta_{rel} \in [60°, 120°] \cup [240°, 300°]$$

Among them, $\Delta L$ represents a reserved distance of anti-scratch, which can be defined by the user, optionally, it can be set to be 1 meter. It should be noted that the same is true for the two vehicles driving in the opposite direction.

Sixth: Iteratively calculating whether the rectangle model of the host vehicle and the rectangle model of the distant vehicle intersect, and when it is determined that the rectangle model of the host vehicle intersects with the rectangle model of the distant vehicle, a collision time when the rectangle model of the host vehicle collides with the rectangle model of the distant vehicle is obtained.

Figure 8:
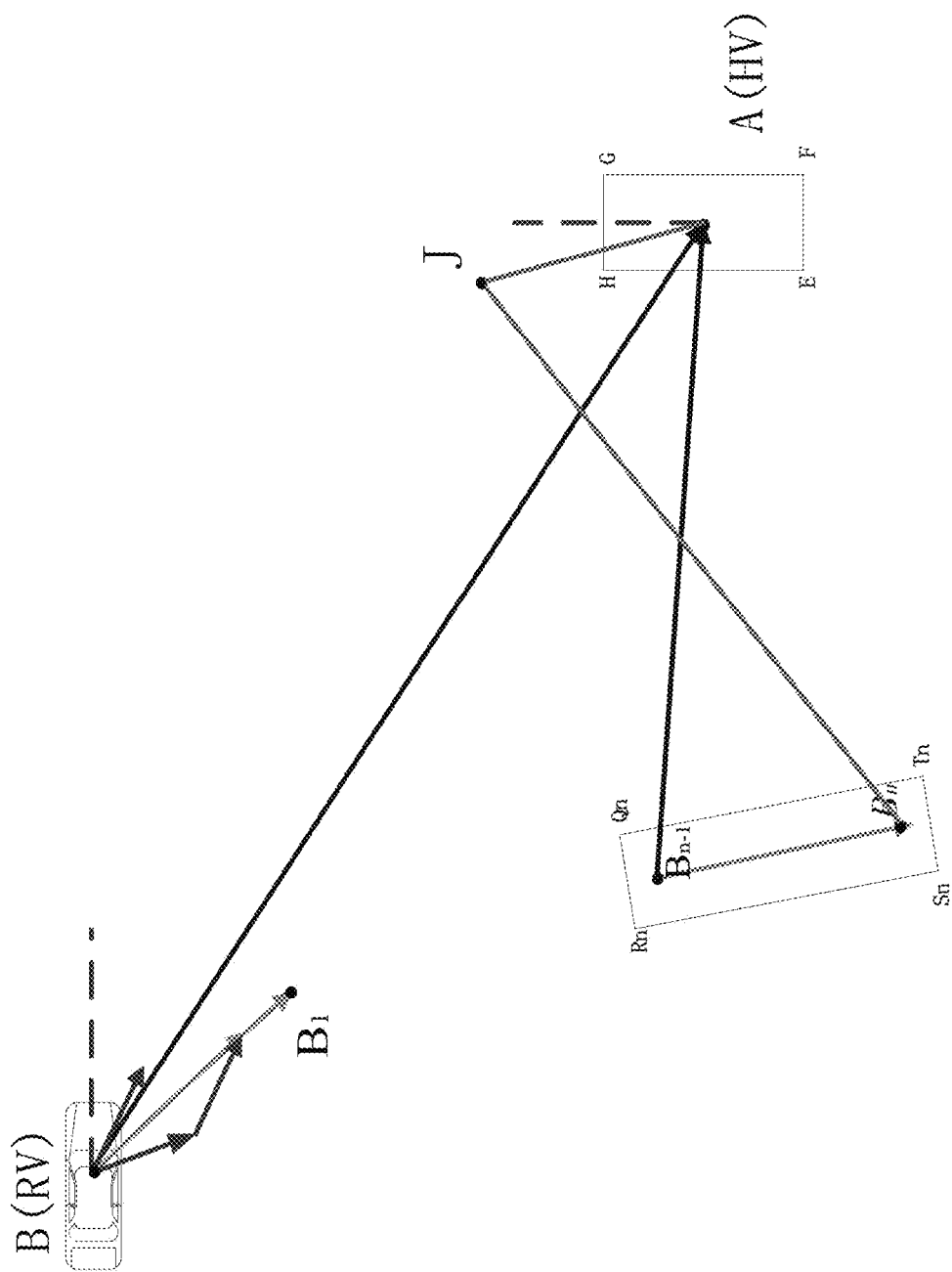
FIG. 8 is a schematic diagram of a relative motion relationship between the rectangular model of the distant vehicle involved in block S20 and a sightline in the vehicle early warning method provided by the second embodiment of the present disclosure.

In one embodiment, an area swept by a vehicle in the nth $\Delta t$ time can be approximated according to the rectangular model and the relative driving trajectory of the vehicle described above. As shown in FIG. 5 and FIG. 8, the rectangle $Q_n R_n S_n T_n$ represents an area swept by the distant vehicle B relative to the host vehicle A in $\Delta t$ time. If the rectangle $Q_n R_n S_n T_n$ and the rectangle EFGH overlap, it means that the two vehicles have a risk of collision at time $n\Delta t$ (compare FIG. 7 and FIG. 8). A principle of judging whether the rectangular models of the vehicles overlap is to judge whether the rectangle $Q_n R_n S_n T_n$ intersects with the rectangle EFGH, and the judgment of intersection is performed by combining all side lengths of the two rectangles.

Therefore, iterative calculation is performed according to the above-mentioned rectangle models of the host vehicle and the distant vehicle. When the rectangle $Q_n R_n S_n T_n$ of the rectangle model of the distant vehicle in FIG. 8 intersects with the rectangle EFGH of the rectangle model of the host vehicle, the iterative calculation is stopped and a number of iterations n and a collision time ttc (time to collision) are returned. If the above conditions are not satisfied, the iterative calculation continues to run until the number of iterations n=Nmax, where Nmax=Nmax0*M, * represents a multiplication operation, and Nmax0 represents a default initial maximum number of iterations, if it is still calculated that there is no collision risk between the two vehicles, return no collision risk (ttc=−1).

The collision time is set to be calculated as follows:

$$ttc = n\Delta t + \frac{|\overrightarrow{B_n A}|}{\frac{1}{2}\left(v_{BA,t_{n-1}} + v_{BA,t_n}\right)}$$

If $0 \leq ttc \leq t_w$, it means that after the distant vehicle B and the host vehicle A travel for the time ttc with current operating parameters, a relative distance between the two vehicles will be less than or equal to the warning distance.

It should be noted that, since the operating parameters can describe the motion trajectories of the host vehicle and the distant vehicle, the vehicle information is used to represent a driving state and physical attribute information of the vehicle, and a screening rule includes a relationship between the operating parameters, so it the operation parameters can be determined according to the vehicle information of the host vehicle and the vehicle information of the distant vehicle, and the relationship between the operation parameters can be determined according to the preset screening rules, and then a vehicle having a warning level which is to be alerted can be filtered out from a plurality of distant vehicles for early warning.

Wherein, the screening rule may include any one of a first screening rule, a second screening rule, and a third screening rule, or a combination of thereof, which is not limited in this embodiment.

The first screening rule includes that the distance between the centroids of the two vehicles is greater than a preset preliminary screening radius, and the preliminary screening radius may be preset, for example, it may be set according to road conditions. The first screening rule can be expressed by a formula $|\vec{BA}|>R$ or a variant of the formula, in which $\vec{BA}$ represents the vector connecting the centroids of the two vehicles, A and B respectively represent the coordinates of the centroids of the two vehicles; R represents the preset primary screening radius, the initial screening radius R can be set according to experience (such as 200 m, 300 m, 500 m, etc.), or it can be adjusted according to actual road conditions where the vehicle is loaded or according to screening needs.

The second screening rule includes: a sum of the speeds of the projections of the speeds of the two vehicles on the vector connecting the centroids of the two vehicles is greater than 0, that is, it is considered that there is a possibility of collision between the two vehicles, and when the sum of the speeds of the projections of the speeds of the two vehicles on the vector connecting the centroids of the two vehicles is less than or equal to 0, that is, the possibility of collision between the two vehicles is considered to be low.

Figure 9B:
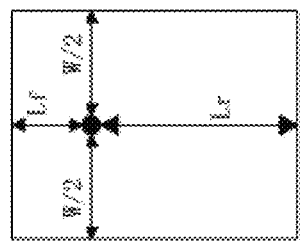
Figure 10:
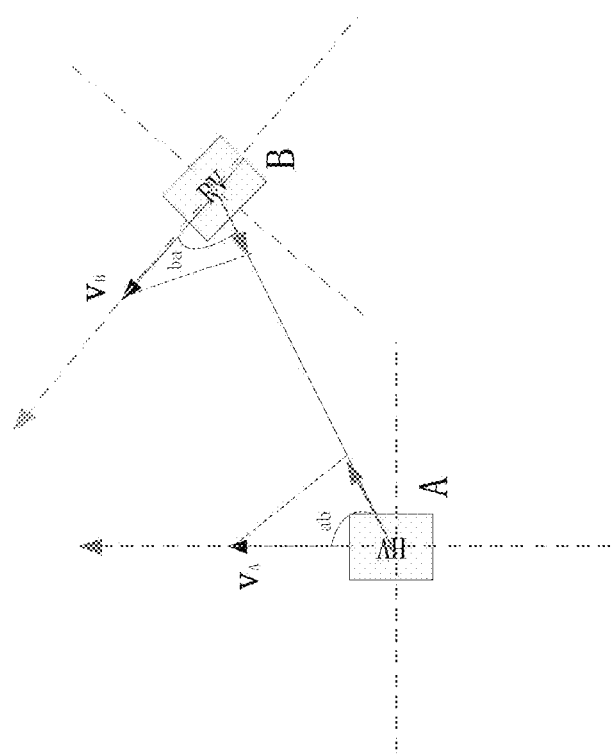
FIG. 10 is a schematic diagram of a relative motion relationship when the host vehicle selects a distant vehicle being collided involved in block S20 in the vehicle early warning method provided by the second embodiment of the present disclosure.

As shown in FIG. 9, the sum $u_{BA}$ of the speeds of the projections of the speeds of the two vehicles on the vector connecting the centroids of the two vehicles can be calculated according to a formula:

$$u_{BA} = v_A \cos(ab) + v_B \cos(ba)$$

$$= \frac{\vec{v}_A \cdot \vec{AB}}{|AB|} + \frac{\vec{v}_B \cdot \vec{BA}}{|BA|} = \frac{(\vec{v}_A - \vec{v}_B) \cdot \vec{AB}}{|AB|}$$

It is equivalent to judging an angle between the vector (vector $\vec{BA}$) connecting two centroids of the two vehicles and the relative motion trajectory vector (vector $\vec{BB_1}$) of the two vehicles, that is, when $\vec{BB_1} \cdot \vec{BA} \leq 0$, vehicle B is leaving relative to vehicle A.

The third screening rule includes: the driving speed of the host vehicle is greater than a preset safe speed threshold, and the relative driving speed of the distant vehicle relative to the host vehicle is greater than the safe speed threshold, where the safe speed threshold may be manually set, or may be set based on road conditions, for example, it can be set to be 10 KM/h. When the driving speed of the host vehicle is less than or equal to the safe speed threshold, and the relative driving speed of the distant vehicle relative to the host vehicle is less than or equal to the safe speed threshold, it is considered that the possibility of collision between the two vehicles is relatively small at this speed; when the driving speed of the host vehicle is greater than the safe speed threshold, the host vehicle is traveling faster, or when the relative driving speed of the distant vehicle relative to the host vehicle is greater than the safe speed threshold, it is considered that the possibility of collision between the two vehicles is relatively high. In the third screening condition, the description of the distance between the centroids of the two vehicles being greater than the warning radius can refer to the description in the second screening condition.

Seventh: comparing the obtained collision time with the adjusted warning time or the original warning time, and calculate the warning level of the collision between the host vehicle and the distant vehicle according to a comparison result.

In one embodiment, if $0 \leq ttc \leq t_w$, the warning level is determined according to the formula $$W = \left[ W_{max} - \frac{ttc}{\Delta t} \times \frac{|B_n A|}{R_w + \frac{|B_n J|}{2} K} \times S \right]$$

or a deformation of the formula, where [ ] represents a rounding operation (rounding), $W_{max}$ represents a maximum warning level, $R_w$ represents a warning distance, and S represents a safety factor. Optionally, the maximum warning level may be user-defined, which may be a positive integer, such as 10, which means that there are ten warning levels in total. The safety factor can take different values according to the degree of risk of different collision scenarios (forward collision and intersection collision). For the case where the distance between centroids is less than the adjusted warning distance, the system can skip the subsequent iteration process and directly set ttc=0, so that the calculated warning level is directly to be the maximum warning level.

Block S30, the host vehicle generates early warning information according to the warning level and sends the warning information to the driver of the host vehicle.

A specific process includes that the warning level is carried in the warning information and sent to the driver of the host vehicle, and the warning information further includes information such as a relative orientation of the host vehicle.

It can be understood that, when the host vehicle determines that the fatigue degree M of the driver of the host vehicle reaches a second threshold (such as 5), the host vehicle not only sends an alarm signal to the drive of the host vehicle (for example, the host vehicle sends alarm signals including an alarm screen and/or an alarm sound to the central control interface through the CAN bus), and further broadcasts a signal carrying a vehicle being out of control (such as the national standard V2X signal of a vehicle out of control) to the distant vehicle.

Compared with the vehicle early warning method provided in the second embodiment of the present disclosure, a third embodiment of the present disclosure further provides a vehicle early warning device, which is applied on the host vehicle and includes a storage device and a processor, and the storage device stores a computer program, wherein, when the processor executes the computer program, the blocks of the vehicle early warning method in the second embodiment of the present disclosure are implemented. It should be noted that the process of executing the computer program by the processor in the third embodiment of the present disclosure is consistent with the process of execution of each block in the vehicle early warning method provided in the second embodiment of the present disclosure. For details, please refer to the foregoing related content description.

The embodiment of the present disclosure has the following beneficial effects:

First, the present disclosure is based on the position coordinates of the human eye provided by the visual tracking device and the coordinates of the gazing point of the sightline on the inner side of the current projection screen provided by the visual tracking device, and is based on the final gaze point of the sightline and its coordinates being obtained according to the refraction light path of the sightline formed according to the refractive index and curvature of the current projection screen, thereby overcoming the fact that the gaze point identified in the sightline of the traditional vehicle visual tracking technology being a point projected on a surface of a certain screen, which resulting in great limitations and deficiencies in the recognition result.

Second, the present disclosure adjusts the warning level of a collision between the host vehicle and a distant vehicle based on the final gaze point of the sightline or/and the state of the driver of the host vehicle, so that the vehicle can automatically adjusts its own collision warning according to the final gaze point of the sightline and/or the driver's fatigue state, so as to combine the signal advantages of V2X technology with the gaze point recognition advantages of visual tracking technology, and enhance the accuracy and scalability of the vehicle's own collision warning, and improve the vehicle's safety and usability;

Third, the identification of vehicles based on the C-V2X technology of the present disclosure is less affected by factors such as weather, and only relies on state data of the vehicle rather than curvature information of road, thereby further improving driving safety and comfort.

Those of ordinary skill in the art can understand that all or part of the blocks in the method of the above embodiments can be completed by instructing the relevant hardware through a program, and the program can be stored in a computer-readable storage medium, and the storage media may be ROM/RAM, magnetic disk, optical disk, etc.

Orientation and position terms mentioned in the present disclosure, such as "up", "down", "front", "rear", "left", "right", "inside", "outside", "top", "bottom", "sideways", etc., only refer to the orientation or position of the drawings. Therefore, the orientation and position terms used are for describing and understanding the present disclosure, rather than limiting the protection scope of the disclosure.

The above disclosures are only preferred embodiments of the present disclosure, and of course, the scope of the rights of the present disclosure cannot be limited by this. Therefore, equivalent changes made according to the claims of the present disclosure are still within the scope of the present disclosure.

What is claimed is:

1. A method for visually tracking a gaze point of a human eye, which is applied in a host vehicle, comprising:
   in response that a match between the host vehicle and a visual tracking device is established, the host vehicle calculating a distance between a centroid of the host vehicle and the visual tracking device;
   in response that the distance is determined to be less than or equal to a preset distance, the host vehicle periodically receiving position coordinates of a human eye of a driver of the host vehicle and coordinates of a gaze point of a sightline of the human eye on an inner side of a current projection screen, provided by the visual tracking device; wherein, the current projection screen is a windshield or a front window of the host vehicle; and
   the host vehicle screening out a refractive index and a curvature of the current projection screen, and combining with the position coordinates of the human eye and the coordinates of the gaze point of the sightline on the inner side of the current projection screen, obtaining coordinates of a gaze point of the sightline on an outer side of the current projection screen and a corresponding refracted light path formed by outward refraction of a sightline, and further combining with a preset normal viewing distance of the human eye, obtaining a final gaze point of a sightline on the corresponding refracted light path and coordinates of the final gaze point.

2. The method for visually tracking a gaze point of a human eye according to claim 1, further comprising:
   if the host vehicle determines that the sightline is first refracted by the front window and then reflected by a rearview mirror, screening out a reflectivity and a curvature of the rearview mirror, and combining with a refracted light path formed by the outward refraction of the sightline through the front window, obtaining the coordinates of the gaze point on the rearview mirror after the sightline is refracted and a first reflected light path formed by the sightline after refraction, and further combining with the normal viewing distance of the human eye, and obtaining the final gaze point of the sightline on the first reflected light path and the coordinates of the final gaze point.

3. The method for visually tracking a gaze point of a human eye according to claim 2, further comprising:
   if the host vehicle determines that the sightline is directly reflected by the rearview mirror without being refracted by the front window of the vehicle, receiving the coordinates of the gaze point of the sightline on the rearview mirror provided by the visual tracking device, obtaining a second reflected optical path directly formed by the sightline on the rearview mirror according to the position coordinates of the human eye and the reflectivity and curvature of the rearview mirror, and the coordinates of the gaze point of the sightline on the rearview mirror, and further combining with the preset normal viewing distance of the human eye, obtaining the final gaze point of the sightline on the second reflected light path and the coordinates of the final gaze point.

4. The method for visually tracking a gaze point of a human eye according to claim 3, further comprising:
   the host vehicle periodically receiving a fatigue state of the driver of the host vehicle provided by the visual tracking device, and obtaining a fatigue degree of the driver according to the fatigue state of the driver, and further, when the fatigue degree of the driver reaches a preset alarm threshold, generating an alarm signal and sent the alarm signal to the driver of the host vehicle.

5. The method for visually tracking a gaze point of a human eye according to claim 4, further comprising:
   if the host vehicle receives vehicle information sent by a distant vehicle within a certain period, the host vehicle broadcasting a signal carrying a sign of a vehicle being out-of-control to the distant vehicle.

6. The method for visually tracking a gaze point of a human eye according to claim 5, further comprising:
   the host vehicle communicating with the visual tracking device based on a V2X broadcast signal or a CAN bus signal.

7. The method for visually tracking a gaze point of a human eye according to claim 6, further comprising:
   the host vehicle communicating with the visual tracking device based on C-V2X technology, and sending its own ID to a portable device of the driver of the host vehicle through a TBOX, and the driver of the host vehicle forwards the ID to the visual tracking device for binding through the portable device, so as to realize a matching between the host vehicle and the visual tracking device.

8. The method for visually tracking a gaze point of a human eye according to claim 7, further comprising:
in response that the calculated distance is determined to be less than or equal to the preset distance, the host vehicle receiving the coordinates of the gaze point of the sightline on the rearview mirror, provided by the visual tracking device.

9. A vehicle early warning method, which is applied in a host vehicle comprising:
the host vehicle periodically receiving position coordinates of a human eye of a driver of the host vehicle and coordinates of a gaze point of a sightline of the human eye on an inner side of a current projection screen, provided by a visual tracking device; wherein, the current projection screen is a windshield or a front window of the host vehicle;
the host vehicle screening out a refractive index and a curvature of the current projection screen, and combining with the position coordinates of the human eye and the coordinates of the gaze point of the sightline on the inner side of the current projection screen, obtaining coordinates of a gaze point of the sightline on an outer side of the current projection screen and a corresponding refracted light path formed by outward refraction of a sightline, and further combining with a preset normal viewing distance of the human eye, obtaining a final gaze point of a sightline on the corresponding refracted light path and coordinates of the final gaze point;
the host vehicle acquiring vehicle information of a distant vehicle within a predetermined period, and acquiring vehicle information of the host vehicle and a fatigue state of the driver of the host vehicle;
according to the vehicle information of the distant vehicle and the vehicle information of the host vehicle, the coordinates of the final gaze point of the sightline, and the fatigue state of the driver of the host vehicle, the host vehicle detecting whether a motion trajectory of the distant vehicle and the sightline intersect, and detecting whether the distant vehicle and the final gaze point of the sightline are located in a same relative azimuth area of the host vehicle and detecting a fatigue degree of the driver of the host vehicle, and according to detection results, the host vehicle determining a warning level of a collision between the host vehicle and the distant vehicle; and
the host vehicle generating early warning information according to the warning level and sending the early warning information to the driver of the host vehicle.

10. The vehicle early warning method according to claim 9, wherein the determining of the warning level of the collision between the host vehicle and the distant vehicle comprises:
the host vehicle substituting the vehicle information of the host vehicle and the vehicle information of the distant vehicle into a discretized kinematic bicycle model separately, and obtaining a motion equation of the host vehicle and a motion equation of the distant vehicle;
according to the vehicle information of the host vehicle and the vehicle information of the distant vehicle, constructing a rectangle model of the host vehicle and a rectangle model of the distant vehicle;
in the motion equation of the host vehicle and the motion equation of the distant vehicle, determining operating parameters corresponding to each moment;
according to the operating parameters and the coordinates of the final gaze point of the sightline, detecting whether the distant vehicle and the final gaze point of the sightline are located in the same relative azimuth area of the host vehicle, and detecting whether the motion trajectory of the rectangle model of the distant vehicle intersects with the sightline; and/or detecting the fatigue degree of the driver of the host vehicle according to the fatigue state of the driver of the host vehicle;
if the motion trajectory of the rectangle model of the distant vehicle does not intersect with the sightline, and the final gaze point of the sightline and the distant vehicle are not located in the same relative azimuth area of the host vehicle, and/or the fatigue degree of the driver of the host vehicle is greater than a first threshold, adjusting a warning time; otherwise, maintaining the warning time;
iteratively calculating whether the rectangle model of the host vehicle and the rectangle model of the distant vehicle intersect, and when the rectangle model of the host vehicle intersects with the rectangle model of the distant vehicle, obtaining a collision time when the rectangle model of the host vehicle collides with the rectangle model of the distant vehicle;
comparing the obtained collision time with the adjusted warning time or an original warning time, and calculating the warning level of the collision between the host vehicle and the distant vehicle according to a comparison result.

11. The vehicle early warning method according to claim 10, further comprising: if the detecting of whether the motion trajectory of the distant vehicle and the sightline intersect, and the detecting of whether the final gaze point of the distant vehicle and the sightline is located in the same relative azimuth area of the host vehicle are need to be performed, the warning time is adjusted according to a formula $$t_w = \frac{t_{w0}}{1 + \frac{|B_n J|}{R_w} K};$$

wherein, $t_w$ represents the adjusted warning time; $t_{w0}$ represents an initial warning time; $R_w$ represents a warning distance; $|B_n J|$ represents a distance of a line vector between position coordinates $B_n$ of the distant vehicle relative to the host vehicle and the coordinates J of the final gaze point of the sightline at time $t_n$, where, if the motion trajectory of the rectangular model of the distant vehicle and the sightline intersect, then $|B_n J|=0$; K equals 1 or 2, where if the final gaze point of the sightline and the distant vehicle are located in the same relative azimuth area of the host vehicle, then, K=1, otherwise K=2.

12. The vehicle early warning method according to claim 10, wherein if only the fatigue degree of the driver of the host vehicle is need to be detected, the warning time is adjusted according to a formula $$t_w = \frac{t_{w0}}{M};$$

wherein, $t_w$ represents the adjusted warning time; $t_{w0}$ represents the initial warning time; M represents the fatigue degree, and M is a positive integer, a value range of M is [1, 5]; a first threshold equals 1.

13. The vehicle early warning method according to claim 12, wherein when the host vehicle determines that the fatigue degree M of the driver of the host vehicle reaches a second threshold, the host vehicle generates an alarm signal and sends the alarm signal to the drive of the host vehicle, and further broadcasts a signal carrying a vehicle being out of control to the distant vehicle.

14. The vehicle early warning method according to claim 10, wherein if the detecting of whether the motion trajectory of the distant vehicle and the sightline intersect, the detecting of whether the distant vehicle and the final gaze point of the sightline are located in the same relative azimuth area of the host vehicle, and the detecting of the fatigue degree of the driver of the host vehicle are all need to be performed, the warning time is adjusted according to a formula $$t_w = \frac{t_{w0}}{M + \frac{|B_n J|}{R_w} K};$$

wherein $t_w$ represents an adjusted warning time; $t_{w0}$ represents an initial warning time; M represents the fatigue degree of the driver of the host vehicle, which is a positive integer, a value range of M is [1, 5]; the first threshold equals 1; $R_w$ represents the warning distance; $|B_n J|$ represents a distance of a line vector between position coordinates $B_n$ of the distant vehicle relative to the host vehicle and the coordinates/of the final gaze point of the sightline at time $t_n$, where, if the motion trajectory of the rectangular model of the distant vehicle and the sightline intersect, then $|B_n J|=0$; K equals 1 or 2, where if the final gaze point of the sightline and the distant vehicle are located in the same relative azimuth area of the host car, then, K=1, otherwise K=2.

15. The vehicle early warning method according to claim 13, wherein when the host vehicle determines that the fatigue degree M of the driver of the host vehicle reaches a second threshold, the host vehicle generates an alarm signal and sends the alarm signal to the drive of the host vehicle, and further broadcasts a signal carrying a vehicle being out of control to the distant vehicle.

16. A vehicle early warning device, applied on a host vehicle, comprising a storage device and a processor, wherein the storage device stores a computer program, when the computer program is executed by the processor, the processor is caused to perform a vehicle early warning method, wherein the vehicle early warning method comprises:
periodically receiving position coordinates of a human eye of a driver of the host vehicle and coordinates of a gaze point of a sightline of the human eye on an inner side of a current projection screen, provided by a visual tracking device; wherein, the current projection screen is a windshield or a front window of the host vehicle;
screening out a refractive index and a curvature of the current projection screen, and combining with the position coordinates of the human eye and the coordinates of the gaze point of the sightline on the inner side of the current projection screen, obtaining coordinates of a gaze point of the sightline on an outer side of the current projection screen and a corresponding refracted light path formed by outward refraction of a sightline, and further combining with a preset normal viewing distance of the human eye, obtaining a final gaze point of a sightline on the corresponding refracted light path and coordinates of the final gaze point;
acquiring vehicle information of a distant vehicle within a predetermined period, and acquiring vehicle information of the host vehicle, and a fatigue state of the driver of the host vehicle;
according to the vehicle information of the distant vehicle and the vehicle information of the host vehicle, the coordinates of the final gaze point of the sightline, and the fatigue state of the driver of the host vehicle, detecting whether a motion trajectory of the distant vehicle and the sightline intersect, and detecting whether the distant vehicle and the final gaze point of the sightline are located in a same relative azimuth area of the host vehicle and detecting a fatigue degree of the driver of the host vehicle, and according to detection results, determining a warning level of a collision between the host vehicle and the distant vehicle; and
generating early warning information according to the warning level and sending the early warning information to the driver of the host vehicle.

17. The vehicle early warning device according to claim 16, wherein the determining of the warning level of the collision between the host vehicle and the distant vehicle comprises:
substituting the vehicle information of the host vehicle and the vehicle information of the distant vehicle into a discretized kinematic bicycle model separately, and obtaining a motion equation of the host vehicle and a motion equation of the distant vehicle;
according to the vehicle information of the host vehicle and the vehicle information of the distant vehicle, constructing a rectangle model of the host vehicle and a rectangle model of the distant vehicle;
in the motion equation of the host vehicle and the motion equation of the distant vehicle, determining operating parameters corresponding to each moment;
according to the operating parameters and the coordinates of the final gaze point of the sightline, detecting whether the distant vehicle and the final gaze point of the sightline are located in the same relative azimuth area of the host vehicle, and detecting whether the motion trajectory of the rectangle model of the distant vehicle intersects with the sightline; and/or detecting the fatigue degree of the driver of the host vehicle according to the fatigue state of the driver of the host vehicle;
if the motion trajectory of the rectangle model of the distant vehicle does not intersect with the sightline, and the final gaze point of the sightline and the distant vehicle are not located in the same relative azimuth area of the host vehicle, and/or the fatigue degree of the driver of the host vehicle is greater than a first threshold, adjusting a warning time; otherwise, maintaining the warning time;
iteratively calculating whether the rectangle model of the host vehicle and the rectangle model of the distant vehicle intersect, and when the rectangle model of the host vehicle intersects with the rectangle model of the distant vehicle, obtaining a collision time when the rectangle model of the host vehicle collides with the rectangle model of the distant vehicle;
comparing the obtained collision time with the adjusted warning time or an original warning time, and calculating the warning level of the collision between the host vehicle and the distant vehicle according to a comparison result.

18. The vehicle early warning device according to claim 17, wherein the method further comprises:

if the detecting of whether the motion trajectory of the distant vehicle and the sightline intersect, and the detecting of whether the final gaze point of the distant vehicle and the sightline is located in the same relative azimuth area of the host vehicle are need to be performed, the warning time is adjusted according to a formula $$t_w = \frac{t_{w0}}{1 + \frac{|B_n J|}{R_w} K};$$

wherein, $t_w$ represents the adjusted warning time; $t_{w0}$ represents an initial warning time; $R_w$ represents a warning distance; $|B_n J|$ represents a distance of a line vector between position coordinates $B_n$ of the distant vehicle relative to the host vehicle and the coordinates J of the final gaze point of the sightline at time $t_n$, where, if the motion trajectory of the rectangular model of the distant vehicle and the sightline intersect, then $|B_n J|=0$; K equals 1 or 2, where if the final gaze point of the sightline and the distant vehicle are located in the same relative azimuth area of the host vehicle, then, K=1, otherwise K=2.

19. The vehicle early warning device according to claim 16, wherein the method further comprises:

if only the fatigue degree of the driver of the host vehicle is need to be detected, the warning time is adjusted according to a formula $$t_w = \frac{t_{w0}}{M};$$

wherein, $t_w$ represents the adjusted warning time; $t_{w0}$ represents the initial warning time; M represents the fatigue degree, and M is a positive integer, a value range of M is [1, 5]; a first threshold equals 1.

20. The vehicle early warning device according to claim 19, wherein the method further comprises:

when the fatigue degree M of the driver of the host vehicle reaches a second threshold, generating an alarm signal and sending the alarm signal to the drive of the host vehicle, and further broadcasts a signal carrying a vehicle being out of control to the distant vehicle.

* * * * *